(12) United States Patent
Vazquez Moreno

(10) Patent No.: US 12,543,974 B2
(45) Date of Patent: Feb. 10, 2026

(54) TECHNIQUES FOR ADJUSTING POWER CONSUMPTION OF A WEARABLE DEVICE BASED ON HEART RATE DATA

(71) Applicant: Oura Health Oy, Oulu (FI)

(72) Inventor: Juan de Dios Vazquez Moreno, Oulu (FI)

(73) Assignee: Oura Health Oy, Oulu (FI)

( * ) Notice: Subject to any disclaimer, the term of this patent is extended or adjusted under 35 U.S.C. 154(b) by 337 days.

(21) Appl. No.: 18/315,660

(22) Filed: May 11, 2023

(65) Prior Publication Data

US 2024/0374163 A1 Nov. 14, 2024

(51) Int. Cl.
*A61B 5/11* (2006.01)
*A61B 5/00* (2006.01)
*A61B 5/0205* (2006.01)

(52) U.S. Cl.
CPC .......... *A61B 5/1118* (2013.01); *A61B 5/0205* (2013.01); *A61B 5/681* (2013.01); *A61B 2560/0209* (2013.01); *A61B 2562/0219* (2013.01)

(58) Field of Classification Search
CPC ..... A61B 5/1118; A61B 5/0205; A61B 5/681; A61B 2560/0209; A61B 2562/0219; A61B 5/02438
See application file for complete search history.

(56) References Cited

U.S. PATENT DOCUMENTS

| | | | | |
|---|---|---|---|---|
| 2005/0065444 A1* | 3/2005 | Erkkila | .............. | A61B 5/02405 600/515 |
| 2016/0051823 A1* | 2/2016 | Maile | ................. | A61N 1/37217 607/16 |
| 2019/0069245 A1* | 2/2019 | Miller | .................... | A61B 5/742 |
| 2019/0090756 A1* | 3/2019 | Lu | ......... | A61B 5/7275 |
| 2019/0110755 A1* | 4/2019 | Capodilupo | ....... | A61B 5/02416 |
| 2020/0289055 A1* | 9/2020 | Vleugels | ................ | G16H 50/20 |
| 2022/0248968 A1* | 8/2022 | Xi | ...................... | A61B 5/14552 |

* cited by examiner

*Primary Examiner* — Michael J Lau
(74) *Attorney, Agent, or Firm* — Holland & Hart LLP

(57) ABSTRACT

Methods, systems, and devices for adjusting power consumption of a wearable device based on heart rate data are described. The method may include acquiring first physiological data from a user in accordance with a first measurement configuration associated with a first power consumption and determining a heart rate of the user based on the first physiological data. Further, the method may include comparing the heart rate to a set of heart rate ranges associated with the user and selecting a second measurement configuration associated with a second power consumption based on the heart rate of the user falling into a second heart rate range. Moreover, the method may include acquiring second physiological data in accordance with the second measurement configuration.

20 Claims, 9 Drawing Sheets

TECHNIQUES FOR ADJUSTING POWER CONSUMPTION OF A WEARABLE DEVICE BASED ON HEART RATE DATA

FIELD OF TECHNOLOGY

The following relates to wearable devices and data processing, including techniques for adjusting power consumption of a wearable device based on heart rate data.

BACKGROUND

Some wearable devices may be configured to collect physiological data from a user. The physiological data may include a respiration rate, a heart rate, heart rate variability (HRV), blood oxygen saturation (SpO2), etc. for the user. In order to collect more accurate physiological data, the wearable device may adjust parameters of sensors or other components. For example, the wearable device may increase a sampling rate that the sensors operate at in order to increase accuracy. However, adjusting such parameters may increase power consumption at the wearable device resulting in a decrease in battery life of the wearable device. As such, there may be a tradeoff between increased data accuracy and power consumption at the wearable device.

DETAILED DESCRIPTION

Figure 1:
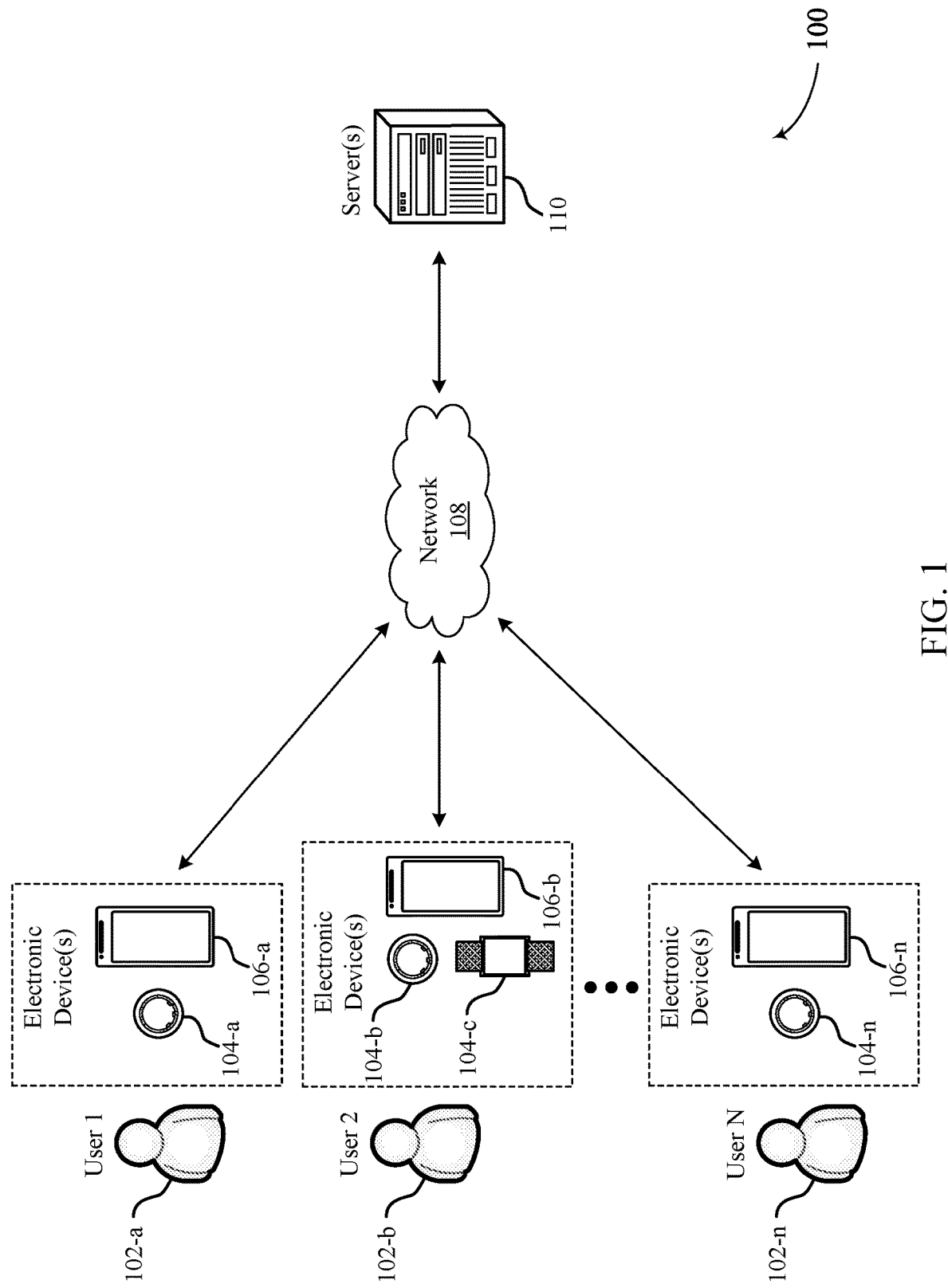
FIG. 1 illustrates an example of a system that supports techniques for adjusting power consumption of a wearable device based on heart rate data in accordance with aspects of the present disclosure.

In some examples, a wearable device may utilize one or more sensors to collect physiological data for a user of the wearable device. As an example, the wearable device may collect blood oxygen saturation data for the user via the one or more sensors. The user may rely on the wearable to accomplish multiple tasks. One of these tasks may be to provide the user with accurate physiological data and another task may be for the wearable device to operate for long periods of time (e.g., have an extended battery life). However, these two tasks may not go hand-in-hand. For example, in order to collect accurate physiological data for the user, the wearable device may configure the one or more sensors used to acquire the physiological data with a high sampling rate (e.g., a sampling rate above a threshold) or a high supply voltage (e.g., a voltage above a threshold). A high sampling rate or a high supply voltage may increase power consumption at the wearable device resulting in a decrease in battery life of the wearable device. Thus, as the accuracy of physiological data increases, the battery life of the wearable device may decrease and vice versa.

Different conditions of the user and/or wearable device may enable the wearable device to collect high-quality data using varying measurement configurations. For example, in cases where the user is engaging in strenuous activity (e.g., high movement), the wearable device may have to operate sensors with a high sampling rate in order to acquire high quality physiological data during the strenuous activity. The high sampling rate may also result in increased battery consumption of the wearable device. Comparatively, when the user is sitting down and remaining relatively still, the wearable device may be able to acquire high quality physiological data with a lower sampling rate. That is, when the user is sitting down, a high sampling rate may be considered to be "overkill" and a waste of battery consumption due to the fact that a lower sampling rate (and therefore lower battery consumption) may also result in high quality physiological data.

Accordingly, aspects of the present disclosure may enable a wearable device to adapt a measurement configuration used to collect physiological data for the user based on an activity level of the user and one or more demographic characteristics of the user (e.g., an age of the user). In some examples, the wearable device may collect heart rate data from the user and estimate an intensity of an activity being performed by the user by comparing the heart rate data to a set of heart rate ranges. The heart rate ranges may depend on one or more demographic characteristics of the user, such as the age of the user, and each heart rate range of the set may represent a different activity intensity. As an example, the different activity intensities may include light activity, moderate activity, and high/intense activity.

After determining the activity intensity based on the heart rate data falling into one of the heart rate ranges of the set of heart rate ranges, the wearable device may select a measurement configuration used by the one or more sensors. In some cases, each heart rate range may correspond to a respective measurement configuration (e.g., first measurement configuration for a first heart rate range, second measurement configuration for a second heart rate range, etc.). The measurement configuration may define different operational parameters for the one or more sensors used to acquire the physiological data. For example, the measurement configuration may define a sampling rate for the one or more sensors. In one example, the wearable device may estimate that the user is performing intense activity and select a measurement configuration with a high sampling rate and therefore, high power consumption. Alternatively, the wearable device may estimate that the user is performing light activity and select a measurement configuration with a low sampling rate and therefore, low power consumption. As such, by adjusting measurement configurations based on the user's heart rate and age, the wearable device may be able to collect physiological data with a sufficient sampling rate to achieve high quality data, and reduce the sampling rate when higher sampling rates are not needed Aspects of the disclosure are initially described in the context of systems supporting physiological data collection from users via wearable devices. Additional aspects are described in the context of a flow diagram and a graphical user interface (GUI). Aspects of the disclosure are further illustrated by and described with reference to apparatus diagrams, system diagrams, and flowcharts that relate to techniques for adjusting power consumption of a wearable device based on heart rate data.

FIG. 1 illustrates an example of a system 100 that supports techniques for adjusting power consumption of a wearable device based on heart rate data in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, that may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices (e.g., IoT devices), smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, blood oxygen saturation (SpO2), blood sugar levels (e.g., glucose metrics), and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, some of which may measure physiological parameters and some of which may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-a (User 1) may operate, or may be associated with, a wearable device 104-a (e.g., ring 104-a) and a user device 106-a that may operate as described herein. In this example, the user device 106-a associated with user 102-a may process/store physiological parameters measured by the ring 104-a. Comparatively, a second user 102-b (User 2) may be associated with a ring 104-b, a watch wearable device 104-c (e.g., watch 104-c), and a user device 106-b, where the user device 106-b associated with user 102-b may process/store physiological parameters measured by the ring 104-b and/or the watch 104-c. Moreover, an nth user 102-n (User N) may be associated with an arrangement of electronic devices described herein (e.g., ring 104-n, user device 106-n). In some aspects, wearable devices 104 (e.g., rings 104, watches 104) and other electronic devices may be communicatively coupled to the user devices 106 of the respective users 102 via Bluetooth, Wi-Fi, and other wireless protocols.

In some implementations, the rings 104 (e.g., wearable devices 104) of the system 100 may be configured to collect physiological data from the respective users 102 based on arterial blood flow within the user's finger. In particular, a ring 104 may utilize one or more light-emitting components, such as LEDs (e.g., red LEDs, green LEDs) that emit light on the palm-side of a user's finger to collect physiological data based on arterial blood flow within the user's finger. In general, the terms light-emitting components, light-emitting elements, and like terms, may include, but are not limited to, LEDs, micro LEDs, mini LEDs, laser diodes (LDs) (e.g., vertical cavity surface-emitting lasers (VCSELs), and the like.

In some cases, the system 100 may be configured to collect physiological data from the respective users 102 based on blood flow diffused into a microvascular bed of skin with capillaries and arterioles. For example, the system 100 may collect PPG data based on a measured amount of blood diffused into the microvascular system of capillaries and arterioles. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that utilize LEDs that are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network 108 protocols. Network connections between the network 108 and the respective electronic devices may facilitate transport of data via email, web, text messages, mail, or any other appropriate form of interaction within a computer network 108. For example, in some implementations, the ring 104-*a* associated with the first user 102-*a* may be communicatively coupled to the user device 106-*a*, where the user device 106-*a* is communicatively coupled to the servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the servers 110 may receive data from the user devices 106 via the network 108, and may store and analyze the data. Similarly, the servers 110 may provide data to the user devices 106 via the network 108. In some cases, the servers 110 may be located at one or more data centers. The servers 110 may be used for data storage, management, and processing. In some implementations, the servers 110 may provide a web-based interface to the user device 106 via web browsers.

In some aspects, the system 100 may detect periods of time that a user 102 is asleep, and classify periods of time that the user 102 is asleep into one or more sleep stages (e.g., sleep stage classification). For example, as shown in FIG. 1, User 102-*a* may be associated with a wearable device 104-*a* (e.g., ring 104-*a*) and a user device 106-*a*. In this example, the ring 104-*a* may collect physiological data associated with the user 102-*a*, including temperature, heart rate, HRV, respiratory rate, and the like. In some aspects, data collected by the ring 104-*a* may be input to a machine learning classifier, where the machine learning classifier is configured to determine periods of time that the user 102-*a* is (or was) asleep. Moreover, the machine learning classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-*a* via a GUI of the user device 106-*a*. Sleep stage classification may be used to provide feedback to a user 102-*a* regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle, that repeats approximately every 24 hours. In this regard, techniques described herein may utilize circadian rhythm adjustment models to improve physiological data collection, analysis, and data processing. For example, a circadian rhythm adjustment model may be input into a machine learning classifier along with physiological data collected from the user 102-*a* via the wearable device 104-*a*. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state; 2) circadian rhythms; 3) non-endogenous daily rhythms shown to be imposed on top of circadian rhythms, as in work schedules; 4) weekly rhythms, or other artificial time periodicities exogenously imposed (e.g., in a hypothetical culture with 12 day "weeks," 12 day rhythms could be used); 5) multi-day ovarian rhythms in women and spermatogenesis rhythms in men; 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

In some aspects, the respective devices of the system 100 may support techniques for adjusting power consumption of a wearable device 104 based on heart rate data. In some examples, a wearable device 104 may estimate the heart rate of a user 102 of the wearable device 104 using at least one LED and one photodetector. The LED may transmit light along an optical channel that goes through an artery of the user 102 and the photodetector may receive the light. Once the light is received by the photodetector, the wearable device 104 may analyze characteristics of the received light and determine the heart rate of the user 102.

After determining the heart rate of the user 102, the wearable device 104 may compare the heart rate of the user 102 to a set of heart rate ranges. Each heart rate range may correspond to an activity level of the user 102. Further, the set of heart rate ranges may be established by a medical association. As such, each heart rate range for the user 102 may be a heart rate range that the medical association observed while individuals of the same age or medical condition as the user 102 performed the corresponding activity level (e.g., low, moderate, or high).

Once determining the activity level of the user 102, the wearable device 104 may select a measurement configuration from a set of measurement configurations based on the activity level. The measurement configurations may specify different operational parameters that may affect a communication protocol for one or more sensors (e.g., the LED or the photodetector) of the wearable device 104 used to collect physiological data for the user 102. For example, the measurement configurations may specify a baud rate, a sampling rate, a bit rate, etc. for the sensors.

As one example, the set of measurement configurations may include a first measurement configuration and a second measurement configuration. The first measurement configuration may specify a higher sampling rate than the second measurement configuration. If the wearable device 104 determines that the activity level of the user 102 is high, the wearable device 104 may choose the first measurement configuration and acquire physiological data for the user 102 using one or more sensors that are operating according to the first measurement configuration. Using such methods may allow the wearable device 104 to expend more power only in situations when accurate data is beneficial to the user 102 thereby improving overall power consumption.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
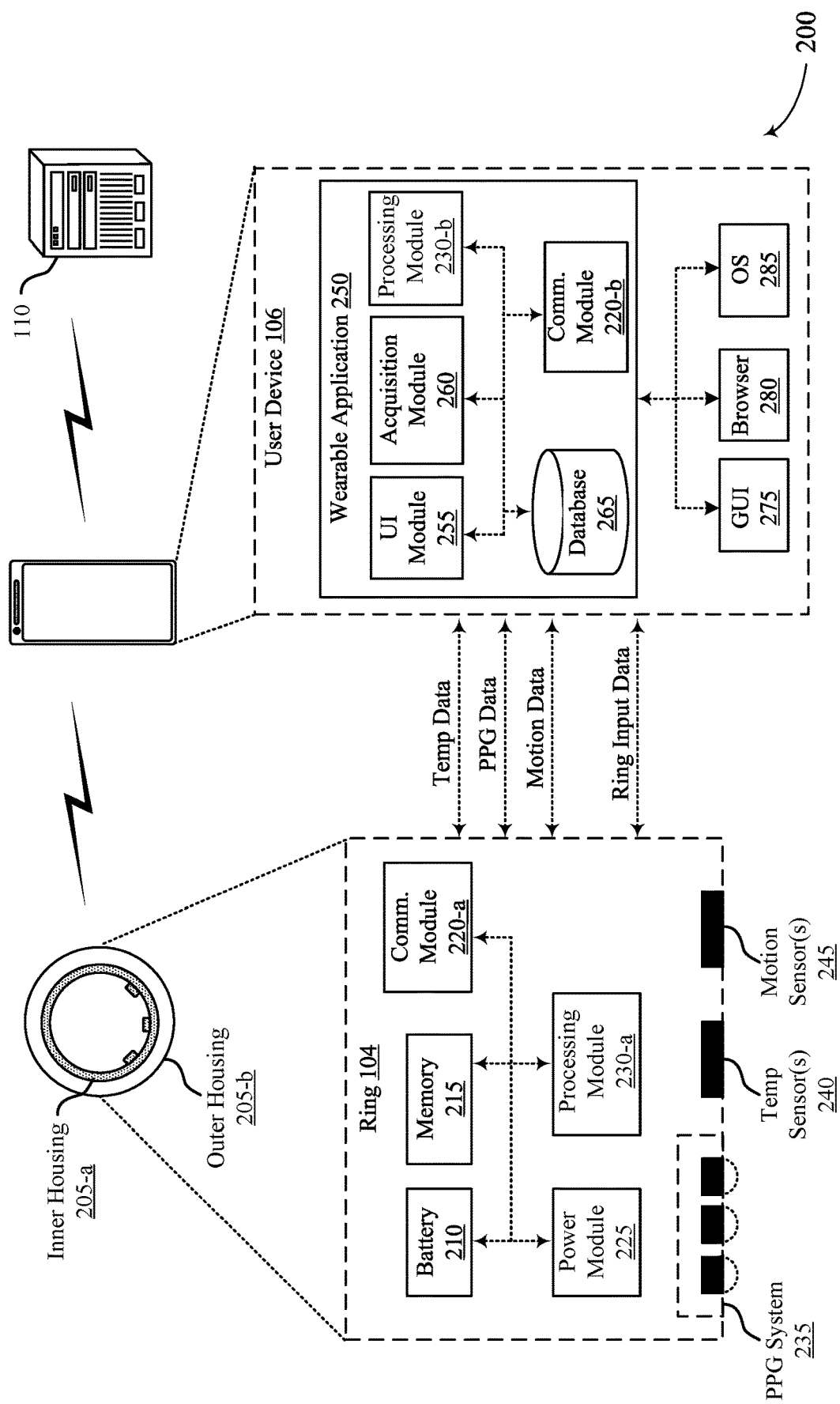
FIG. 2 illustrates an example of a system that supports techniques for adjusting power consumption of a wearable device based on heart rate data in accordance with aspects of the present disclosure.

FIG. 2 illustrates an example of a system 200 that supports techniques for adjusting power consumption of a wearable device based on heart rate data in accordance with aspects of the present disclosure. The system 200 may implement, or be implemented by, system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels (SpO2), blood sugar levels (e.g., glucose metrics), and the like.

The system 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, photoplethysmogram (PPG) data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205 that may include an inner housing 205-*a* and an outer housing 205-*b*. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-*a*, a memory 215, a communication module 220-*a*, a power module 225, and the like. The device electronics may also include one or more sensors. Example sensors may include one or more temperature sensors 240, a PPG sensor assembly (e.g., PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using adhesives, wraps, clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-b component (e.g., a shell) and an inner housing 205-a component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-b (e.g., a metal outer housing 205-b). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate(s) from water and/or other chemicals.

The outer housing 205-b may be fabricated from one or more materials. In some implementations, the outer housing 205-b may include a metal, such as titanium, that may provide strength and abrasion resistance at a relatively light weight. The outer housing 205-b may also be fabricated from other materials, such polymers. In some implementations, the outer housing 205-b may be protective as well as decorative.

The inner housing 205-a may be configured to interface with the user's finger. The inner housing 205-a may be formed from a polymer (e.g., a medical grade polymer) or other material. In some implementations, the inner housing 205-a may be transparent. For example, the inner housing 205-a may be transparent to light emitted by the PPG light emitting diodes (LEDs). In some implementations, the inner housing 205-a component may be molded onto the outer housing 205-b. For example, the inner housing 205-a may include a polymer that is molded (e.g., injection molded) to fit into an outer housing 205-b metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible PCB (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., PPG system 235, temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits). The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules must be realized by separate hardware/software components. Rather, functionality associated with one or more modules may be performed by separate hardware/software components or integrated within common hardware/software components.

The processing module 230-a of the ring 104 may include one or more processors (e.g., processing units), microcontrollers, digital signal processors, systems on a chip (SOCs), and/or other processing devices. The processing module 230-a communicates with the modules included in the ring 104. For example, the processing module 230-a may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-*a* may communicate with the memory 215. The memory 215 may include computer-readable instructions that, when executed by the processing module 230-*a*, cause the processing module 230-*a* to perform the various functions attributed to the processing module 230-*a* herein. In some implementations, the processing module 230-*a* (e.g., a microcontroller) may include additional features associated with other modules, such as communication functionality provided by the communication module 220-*a* (e.g., an integrated Bluetooth Low Energy transceiver) and/or additional onboard memory 215.

The communication module 220-*a* may include circuits that provide wireless and/or wired communication with the user device 106 (e.g., communication module 220-*b* of the user device 106). In some implementations, the communication modules 220-*a*, 220-*b* may include wireless communication circuits, such as Bluetooth circuits and/or Wi-Fi circuits. In some implementations, the communication modules 220-*a*, 220-*b* can include wired communication circuits, such as Universal Serial Bus (USB) communication circuits. Using the communication module 220-*a*, the ring 104 and the user device 106 may be configured to communicate with each other. The processing module 230-*a* of the ring may be configured to transmit/receive data to/from the user device 106 via the communication module 220-*a*. Example data may include, but is not limited to, motion data, temperature data, pulse waveforms, heart rate data, HRV data, PPG data, and status updates (e.g., charging status, battery charge level, and/or ring 104 configuration settings). The processing module 230-*a* of the ring may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or that supplements, data collected by the ring 104 itself. Moreover, a charger or other power source for the ring 104 may function as a user device 106, in which case the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during charging. The power module 225 may also regulate voltage(s) of the device electronics, regulate power output to the device electronics, and monitor the state of charge of the battery 210. In some implementations, the battery 210 may include a protection circuit module (PCM) that protects the battery 210 from high current discharge, over voltage during charging, and under voltage during discharge. The power module 225 may also include electro-static discharge (ESD) protection.

The one or more temperature sensors 240 may be electrically coupled to the processing module 230-*a*. The temperature sensor 240 may be configured to generate a temperature signal (e.g., temperature data) that indicates a temperature read or sensed by the temperature sensor 240. The processing module 230-*a* may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-*a*) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-*a* may use to determine the temperature. As another example, in cases where the temperature sensor 240 includes a passive sensor, the processing module 230-*a* (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-*a* may sample the user's temperature over time. For example, the processing module 230-*a* may sample the user's temperature according to a sampling rate. An example sampling rate may include one sample per second, although the processing module 230-*a* may be configured to sample the temperature signal at other sampling rates that are higher or lower than one sample per second. In some implementations, the processing module 230-*a* may sample the user's temperature continuously throughout the day and night. Sampling at a sufficient rate (e.g., one sample per second) throughout the day may provide sufficient temperature data for analysis described herein.

The processing module 230-*a* may store the sampled temperature data in memory 215. In some implementations, the processing module 230-*a* may process the sampled temperature data. For example, the processing module 230-*a* may determine average temperature values over a period of time. In one example, the processing module 230-*a* may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate, which may be stored in memory 215, may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-a near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-a may acquire and process data from multiple temperature sensors 240 in a similar manner described with respect to a single temperature sensor 240. For example, the processing module 230 may individually sample, average, and store temperature data from each of the multiple temperature sensors 240. In other examples, the processing module 230-a may sample the sensors at different rates and average/store different values for the different sensors. In some implementations, the processing module 230-a may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-a may sample the PPG signal and determine a user's pulse waveform based on the PPG signal. The processing module 230-a may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 where the optical receiver(s) receive transmitted light that is reflected through the region of the user's finger. In some implementations, the PPG system 235 may be configured as a transmissive PPG system 235 where the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include light-emitting diodes (LEDs). The optical transmitters may transmit light in the infrared spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-a may control one or both of the optical transmitters to transmit light while sampling the PPG signal generated by the optical receiver. In some implementations, the processing module 230-a may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform that may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-a may store the pulse waveform in memory 215 in some implementations. The processing module 230-a may process the pulse waveform as it is generated and/or from memory 215 to determine user physiological parameters described herein.

The processing module 230-*a* may determine the user's heart rate based on the pulse waveform. For example, the processing module 230-*a* may determine heart rate (e.g., in beats per minute) based on the time between peaks in the pulse waveform. The time between peaks may be referred to as an interbeat interval (IBI). The processing module 230-*a* may store the determined heart rate values and IBI values in memory 215.

The processing module 230-*a* may determine HRV over time. For example, the processing module 230-*a* may determine HRV based on the variation in the IBIs. The processing module 230-*a* may store the HRV values over time in the memory 215. Moreover, the processing module 230-*a* may determine the user's respiratory rate over time. For example, the processing module 230-*a* may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-*a* may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BMl160 inertial micro electro-mechanical system (MEMS) sensor that may measure angular rates and accelerations in three perpendicular axes.

The processing module 230-*a* may sample the motion signals at a sampling rate (e.g., 50 Hz) and determine the motion of the ring 104 based on the sampled motion signals. For example, the processing module 230-*a* may sample acceleration signals to determine acceleration of the ring 104. As another example, the processing module 230-*a* may sample a gyro signal to determine angular motion. In some implementations, the processing module 230-*a* may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics, and readiness metrics. In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-*a* may compress the data stored in memory 215. For example, the processing module 230-*a* may delete sampled data after making calculations based on the sampled data. As another example, the processing module 230-*a* may average data over longer periods of time in order to reduce the number of stored values. In a specific example, if average temperatures for a user over one minute are stored in memory 215, the processing module 230-*a* may calculate average temperatures over a five minute time period for storage, and then subsequently erase the one minute average temperature data. The processing module 230-*a* may compress data based on a variety of factors, such as the total amount of used/available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system (OS), a web browser application (e.g., web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-*b*, a communication module 220-*b*, and a storage module (e.g., database 265) configured to store application data.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., Sleep Score, Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep days may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time that the respective users typically sleep.

In some implementations, each overall score for a user for each respective day (e.g., Sleep Score, Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency" contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the number of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs. Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some aspects, the system 200 may support techniques for adjusting power consumption of the ring 104. In some examples, the ring 104 may determine a heart rate of the user (e.g., using the PPG system 235). The ring 104 may determine the heart rate of the user on a periodic basis or an aperiodic basis. Upon determining the heart rate, the ring 104 may determine which heart rate range of a set of heart rate ranges that the heart rate falls into. The heart rate ranges may include a first heart rate range corresponding to low activity or sleep, a second heart rate range corresponding to moderate activity, and a third heart rate range corresponding to high/intense activity. Subsequently, based on the heart rate range that the heart rate falls into, the ring 104 may determine a measurement configuration that will be used to operate one or more sensors (e.g., sensors used to acquire physiological data for the user).

Different measurement configurations may be associated with different power consumptions. For example, a measurement configuration with a high sampling rate or a high baud rate may be associated with a higher power consumption as compared to measurement configurations with lower sampling rates and/or lower baud rates. Because the user may benefit from higher accuracy during high activity versus low activity or moderate activity, the ring 104 may select the measurement configuration that results in the most accurate data (e.g., the measurement configuration that has the highest baud rate or the high power consumption measurement configuration) which inherently results in more power consumption when compared to the other measurement configuration. The ring 104 may then acquire physiological data from the user using the selected measurement configuration. Conversely, when the user is sleeping or otherwise engaged in low activity intensity, the ring may select a measurement configuration associated with a lower sampling rate and/or lower baud rate that will achieve some threshold level of data accuracy. As such, by selecting a measurement configuration with a lower sampling rate that will still achieve the desired measurement accuracy, the ring 104 can lower the power consumption of the wearable device.

Figure 3:
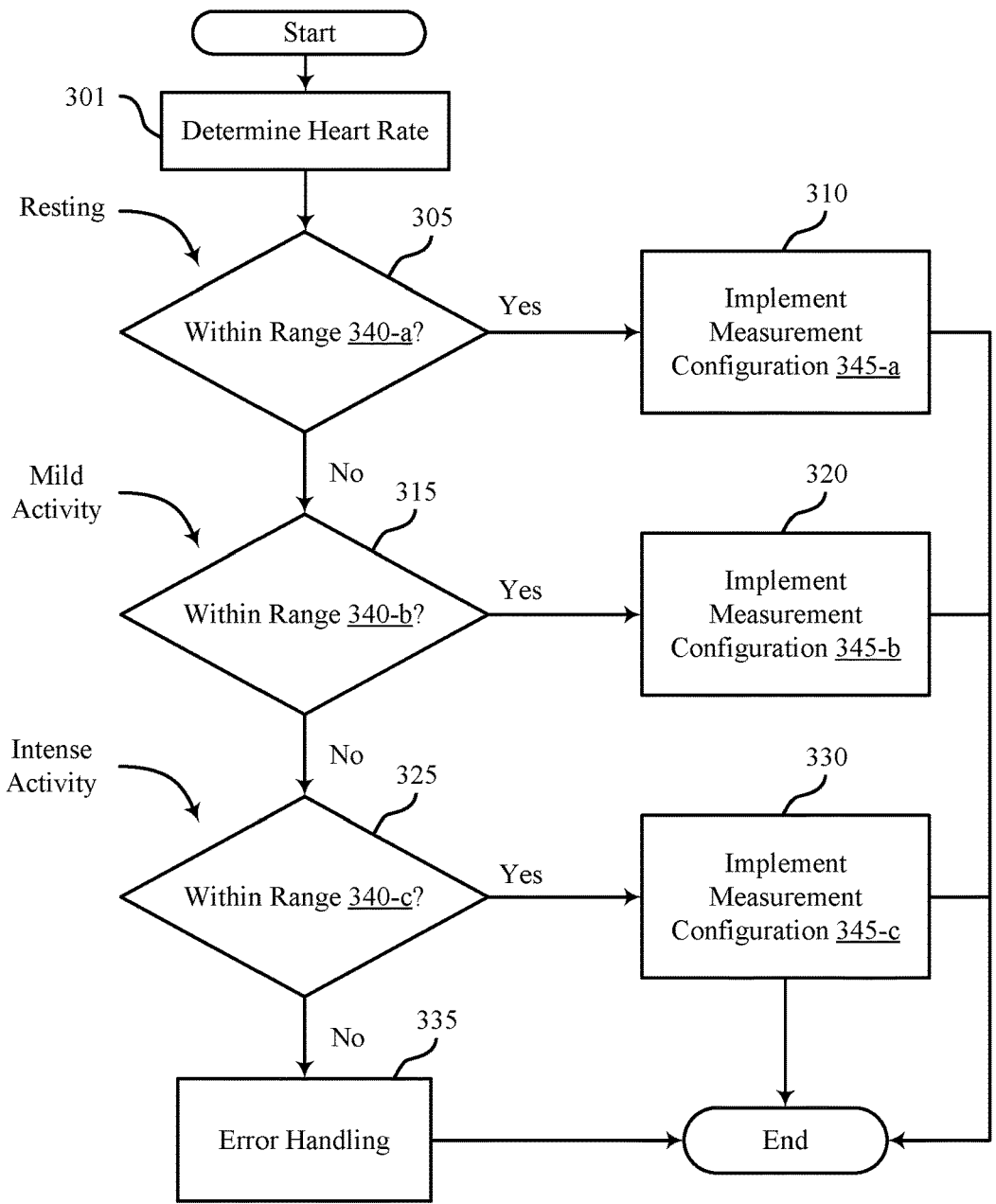
FIG. 3 shows an example of a flow diagram that supports techniques for adjusting power consumption of a wearable device based on heart rate data in accordance with aspects of the present disclosure.
Figure 3:
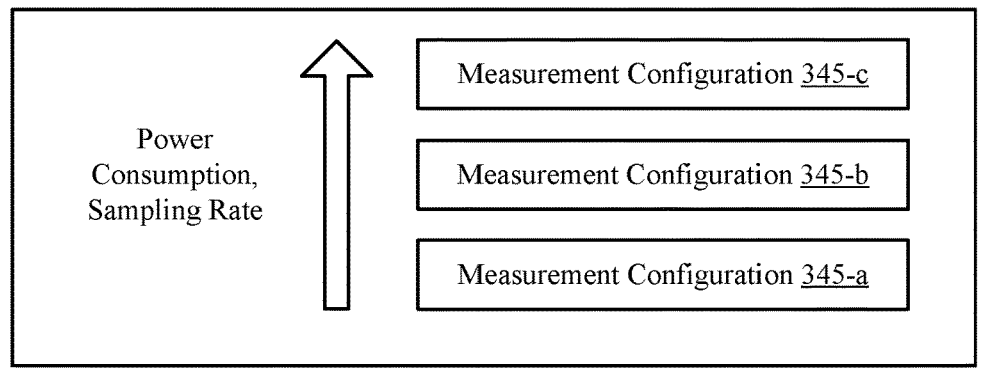

FIG. 3 shows an example of a flow diagram 300 that supports techniques for adjusting power consumption of a wearable device based on heart rate data in accordance with aspects of the present disclosure. In some examples, the flow diagram 300 may be implemented by a wearable device which may be an example of a wearable device 104 or a ring 104 as described with reference to FIGS. 1 and 2.

As described with reference to FIG. 2, a wearable device may collect physiological data from a user of the wearable device. The physiological data may include respiratory rate, heart rate, HRV, oxygen saturation, etc. In some examples, the wearable device may include one or more sensors to aid in the collection of the physiological data from the user. The one or more sensors may include at least an optical transmitter and an optical receiver (e.g., a PPG system) situated along the inner-surface of the wearable device. The optical transmitter may be configured to transmit light through one or more layers of the user's skin and the optical receiver may be configured to receive the light from the optical transmitter. Using the optical transmitter and the optical receiver, the wearable device may detect changes in blood flow through an artery (e.g., of the user's finger) and determine the physiological data (e.g., a heart rate of the user). As another example, the one or more sensors may include temperature sensors or motion sensors (e.g., accelerometers or gyroscopes).

To increase the accuracy of the physiological data, the wearable device may adapt or modify one or more characteristics of the one or more sensors. For example, the wearable device may increase a baud rate associated with the one or more sensors. The baud rate may refer to a rate of information transfer between the one or more sensors and a main core (e.g., or processor) of the wearable device. However, adapting characteristics of the sensors for the purpose of increased accuracy may increase power consumption at the wearable device. In other words, increasing the baud rate and/or sampling rate of the sensors may result in a corresponding increase in power consumption. Increasing the power consumption of the wearable device may result in a more limited battery life which may decrease an overall utility and convenience of the wearable device for the user.

As described herein, the wearable device may adapt a measurement configuration associated with the one or more sensors such that high power consumption at the wearable only occurs when highly accurate data is beneficial for improved data accuracy, thus decreasing the overall power consumption of the wearable device. In other words, aspects of the present disclosure may enable wearable devices to selectively adjust measurement configurations used to acquire physiological data based on the user's heart rate and/or estimated activity levels in order to strike a balance between accurate physiological data collection and power consumption at the wearable device.

In some examples, the wearable device may utilize heart rate to determine or estimate an activity level of the user. For example, the wearable device may determine the user is performing intense activity when the heart rate of the user is within 70% to 85% of the user's maximum heart rate (MHR) (e.g., within a range 340-c). Further, the wearable device may determine the user is performing mild activity when the heart rate of the user is within 50% to 70% of the user's MHR (e.g., within a range 340-b). Moreover, the wearable device may determine the user is sleeping or resting when the heart rate of the user is below 50% of the user's MHR (e.g., within a range 340-a).

However, the MHR for the user may depend heavily on demographic characteristics of the user, such as an age of the user. For example, as shown in Table 1, the MHR for a user that is 20 years old may be 200 bpm and the MHR for a user that is 60 years old may be 160 bpm. As such, the activity level ranges (e.g., the range 340-a, the range 340-b, and the range 340-c) may be different for users of different ages and the wearable device may take the age of the user into account when determining the activity level of the user. The heart rate ranges shown in Table 1 below illustrate average or example heart rate ranges for different ages of users, where the illustrated heart rate ranges may be examples of the "ranges 340" illustrated in FIG. 3.

For example, if the heart rate for a 20 year old user is 135 bpm, the wearable device may determine that the heart rate is within the range 340-b and from this, determine that the user is performing moderate activity. Alternatively, if the heart rate for a 40 year old user is 135 bpm, the wearable device may determine that the heart rate is within the range 340-c and from this, determine that the user is performing intense activity.

TABLE 1

Heart Rate Zones By Age, American Health Association.

| Age | Below 50% of MHR (Sleeping) | 50%-70% of MHR (Mild Activity) | 70%-85% of MHR (Intense Activity) | Maximum Heart Rate (MHR) |
| --- | --- | --- | --- | --- |
| 20 Years | <100 bpm | 100-140 bpm | 140-170 bpm | 200 bpm |
| 30 Years | <95 bpm | 95-133 bpm | 133-162 bpm | 190 bpm |
| 35 years | <93 bpm | 93-130 bpm | 130-157 bpm | 185 bpm |
| 40 years | <90 bpm | 90-126 bpm | 126-153 bpm | 180 bpm |
| 45 years | <88 bpm | 88-123 bpm | 123-149 bpm | 175 bpm |
| 50 years | <85 bpm | 85-119 bpm | 119-144 bpm | 170 bpm |
| 55 years | <83 bpm | 83-116 bpm | 116-140 bpm | 165 bpm |
| 60 years | <80 bpm | 80-112 bpm | 112-136 bpm | 160 bpm |
| 65 years | <78 bpm | 78-109 bpm | 109-132 bpm | 155 bpm |
| 70 Years | <75 bpm | 74-105 bpm | 105-128 bpm | 150 bpm |

In this regard, according to aspects of the present disclosure, the wearable device may determine a user's heart rate, and may estimate a level of physical activity engaged in by the user based on their heart rate and applicable demographic characteristics (such as the user's chronological age, cardiovascular age, medical conditions, gender, etc.). Subsequently, the determined heart rate (and therefore estimated activity level) may be used to select a measurement configuration that will be used by the wearable device to collect physiological data, as will be described in further detail herein.

Another user demographic characteristic that may affect the MHR of the user may be a pre-existing medical condition of the user. Thus, the wearable device may take a user's medical history into account when determining the activity level of the user. As an example, the user may suffer from a type of heart disease that causes Tachycardia or a high resting heart rate. Users suffering from Tachycardia may have a higher MHR and as a result, the ranges presented in the Table 1 (and the ranges 340 illustrated in FIG. 3) may not be applicable to the user. As such, the wearable device may adjust the ranges presented in Table 1 based on a medical condition of the user. For example, if the user suffers from Tachycardia, the wearable device may increase the MHR thereby increasing the ranges for the user.

In some examples, the wearable device may prompt the user (e.g., via a GUI of a user device associated with the wearable device) to input demographic characteristics that may affect the MHR (and other heart rate ranges) of the user. For example, to obtain information on the age of the user or a medical condition of the user, the wearable device may prompt the user to input their age, gender, and any medical conditions they are currently suffering from or previously suffered from.

Further, in some examples, the wearable device may validate the activity level of the user using other sensor data different from the heart rate. For example, the wearable device may utilize motion data to validate the activity level of the user. As one example, the wearable device may determine that the user is performing intense activity based on the heart rate of the user falling into a heart rate range that is relatively close to the user's MHR. To validate that the user is performing intense activity, the wearable device may confirm that the motion data (e.g., motion data collected during a same period that the heart rate was collected) indicates that the user is moving (e.g., accelerating or changing orientation) as opposed to indicating that the user is stationary.

In some cases, the use of heart rate data (relative to applicable demographic characteristics) may be more accurate or reliable with estimating an activity level of the user as compared to motion data alone. For example, a user may utilize a screw driver to drive a screw into a wall. In this example, a wearable device on the user's hand may determine a high level of motion (due to the twisting/screwing motion). In some wearable devices, the high level of motion may be used to inadvertently determine that the user is engaged in intense physical activity. Comparatively, in this same example, the wearable device may determine that the user's heart rate is relatively low, and may therefore determine that the user is engaged in only light physical activity, despite the high motion data attributable to the twisting/screwing motion.

Further, in some examples, the wearable device may be configured with a set of measurement configurations 345. The measurement configurations 345 may include a set of operational parameters for the one or more sensors of the wearable device. The operational parameters may dictate operation of the one or more sensors while being used to collect physiological data from the user. For example, the set of operational parameters for each measurement configuration may include one or more of a baud rate, a sampling rate, a clock speed, a bit rate, or a resolution for acquiring physiological data for the user. Further, each measurement configuration 345 may be associated with a respective level of power consumption. Moreover, the respective measurement configurations 345 may be configured to achieve a certain accuracy threshold during time periods that the user is engaged in varying levels of physical activity.

For example, referring to FIG. 3, a first measurement configuration 345-a may be associated with a relatively low sampling rate, and therefore a relatively low power consumption. As such, the first measurement configuration 345-a may be used to achieve relatively high quality data when the user is asleep or otherwise engaged in light physical activity. However, the first measurement configuration 345-a may be unable to achieve sufficiently high data quality when the user is engaged in intense physical activity due to the relatively low sampling rate of the first measurement configuration 345-a. Comparatively, the second measurement configuration 345-b may be associated with a moderate sampling rate and moderate power consumption, and the third measurement configuration 345-*c* may be associated with a high sampling rate and high power consumption. As such, the second and third measurement configurations 345-*b*, 345-*c* may be used to achieve high-quality data when the user is engaged in moderate and intense physical activity, respectively. However, as described herein, the second and third measurement configurations 345-*b*, 345-*c* may be considered to be "overkill" and may lead to unnecessary battery consumption when the user is resting or otherwise engaged in light physical activity.

The flow diagram 300 walks through an example process that may be implemented by a wearable device to adaptively select a measurement configuration 345 for acquiring physiological data for the user based on an activity level of the user. The flow diagram 300 may allow the wearable device to switch to measurement configurations 345 associated with high power consumption during times when the user is engaged in more complex activities (e.g., to maintain high data quality), and switch to measurement configurations 345 associated with low power consumption during times when the user is performing basic tasks (e.g., to reduce power consumption while maintaining sufficient data quality).

At 301, the system (e.g., wearable device 104, user device 106, servers 110) may determine a heart rate of the user. In one example, the wearable device may determine the heart rate of the user using the PPG system. Alternatively, the system may retrieve or obtain a recent heart rate measurement from memory. That is, the wearable device may regularly check and store the heart rate of the user in memory, and may retrieve or obtain the most recent heart rate data from memory at regular or irregular intervals to perform the analysis shown and described in flow diagram 300. In some aspects, the wearable device may acquire the heart rate data (and/or additional physiological data) in accordance with one of the measurement configurations 345.

In some examples, the wearable device may perform the steps/operations shown and described in the flow diagram 300 multiple times (e.g., periodically or aperiodically). Additionally, or alternatively, the wearable device may determine the heart rate at 301 and perform the various steps/operations of the flow diagram 300 based on determining that the user's heart rate has changed (e.g., changed from one range 340 to another). In other words, in some implementations, the wearable device may trigger the steps/operations of the flow diagram 300 only when the wearable device determines that the user's heart rate has changed from one range 340 to another.

At 305, the wearable device may compare the heart rate of the user to the range 340-*a*. As described herein, the range 340-*a* may correspond to a sleeping state of the user or may be less than 50% of the user's MHR. If the heart rate falls within the range 340-*a*, the wearable device may proceed to 310 and implement measurement configuration 345-*a* (or the low power consumption measurement configuration). That is, the wearable device may collect physiological data from the user using one or more sensors operating in accordance with the measurement configuration 345-*a*. For instance, if the user's heart rate falls into the range 340-*a*, the wearable device may determine that the user is sleeping, or engaged in very light physical activity. As such, the wearable device may select the measurement configuration 345-*a* (which may correspond to the range 340-*a*) that is configured to maintain a sufficient level of data quality, while reducing the overall power consumption of the wearable device.

In some examples, prior to determining the heart rate, the wearable device may collect physiological data using one or more sensors operating in accordance with measurement configuration 345 different from the measurement configuration 345-*a* (e.g., the measurement configuration 345-*b* or the measurement configuration 345-*c*). In such cases, the wearable device may adjust the operational parameters of the one or more sensors such that they match the operational parameters of the measurement configuration 345-*a*. In another example, prior to determining the heart rate, the wearable device may collect physiological data using the one or more sensors operating in accordance with the measurement configuration 345-*a*. In such case, there is no need for the wearable device to adjust the operational parameters of the one or more sensors because the one or more sensors are already operating in accordance with the measurement configuration 345-*a*.

If the heart rate does not fall within the range 340-*a*, the flow diagram 300 may proceed to 315, and the wearable device may compare the heart rate of the user to the range 340-*b*. As described herein, the range 340-*b* may correspond to a moderate activity level or span 50% to 70% of the user's MHR. If the heart rate falls within the range 340-*b*, the wearable device may proceed to 320 and implement measurement configuration 345-*b* (or the medium power consumption measurement configuration). That is, the wearable device may collect physiological data from the user using one or more sensors operating in accordance with the measurement configuration 345-*b*.

If the heart rate does not fall within the range 340-*a* and the range 340-*b*, the flow diagram 300 may proceed to 325, and the wearable device may compare the heart rate of the user to the range 340-*c*. As described herein, the range 340-*c* may correspond to intense activity level or span 70% to 85% of the user's MHR. If the heart rate falls within the range 340-*c*, the wearable device may proceed to 330 and implement measurement configuration 345-*c* (or the high power consumption measurement configuration). That is, the wearable device may collect physiological data from the user using one or more sensors operating in accordance with the measurement configuration 345-*c*.

In some examples, the system (e.g., wearable device, user device) may alert the user when their heart rate changes from one range 340 to another. For example, the wearable device may generate a message that states, "Your heart rate indicates that you are performing intense activity" and a GUI of a user device associated with the wearable device may display the message to the user. The message may allow the user to gain insight on their health. For example, if the user is not performing an intense activity at the time of receiving the message, the user may determine that they may have a health condition and may seek guidance from medical health professionals regarding the health condition.

If the heart rate does not fall within the range 340-*a*, the range 340-*b*, and the range 340-*c*, the wearable device may detect an error, and the flow diagram 300 may proceed to 335. At 335, the wearable device may perform error handling. During error handling, the wearable device may attempt to correct any errors that may have occurred during the flow diagram 300. In one example, the error may have occurred during measurement of the heart rate. As one example, during heart rate measurement, the one or more sensors may not have been situated in an optimal measurement position. For example, if the wearable device is a ring, optical sensors of the ring (e.g., the optical transmitter or the optical receiver) may be situated such that light is emitted on the dorsal side of user's finger (e.g., back of the hand) resulting in inaccurate heart rate measurement. In such examples, the wearable device may display (e.g., via a GUI of a user device associated with the wearable device) a message instructing the user to rotate the ring such that the optical sensors emit light on the palm-side of the user's finger which may be the optical position for PPG measurements. In some examples, after performing the error handling, the wearable device may repeat the flow diagram 300.

Further, in some examples, if the heart rate moves from one range 340 to another range 340, the wearable device may activate, deactivate, or adjust an active time or a frequency of the active time of one or more components of the wearable device (e.g., how long, or how frequently components are activated). For example, if the heart rate moves from the range 340-b or the range 340-c to the range 340-a, the wearable device may deactivate or reduce the active time of one or more motion sensors of the wearable device. The user is not expected to move or may move very little during sleep and keeping the one or more motion sensors activated during sleep may consume excess power without any added benefit. In other words, if the wearable device determines that the user's heart rate has lowered to the range 340-a, the wearable device may determine that the user is sleeping, resting, or otherwise engaged in light physical activity with relatively low movement, and may therefore deactivate or reduce the active time of gyroscopes, accelerometers, or other motion sensors.

In some examples, each range 340 may be associated with an activation schedule. The activation schedule may specify an active time for the one or more components or a frequency associated with the active time for the one or more components (e.g., how often the one or more components are active). In some examples, the active time and the frequency associated with the active time for the range 340-b may be larger than the active time and the frequency associated with the active time for the range 340-b and the range 340-a. Once the wearable device determines which range 340 the heart rate of the user falls into, the wearable device may operate the one or more components according to the corresponding activation schedule.

In another example, if the heart rate moves from one range 340 to another range 340, the wearable device may adjust what types of physiological data are collected for the user. For example, if the heart rate moves from the range 340-b or the range 340-c to the range 340-a, the wearable device may not process or analyze motion data for the user thus conserving processing resources. In some examples, critical components of the wearable device may be unaffected by the change in measurement configuration 345. For example, battery fuel gauges or MCUs of the wearable device may not be affected.

In an alternative example, the user may specify when they would like to utilize different measurement configurations 345. In other words, the user may be able to define relationships (e.g., via a GUI of a user device 106) between different measurement configurations 345 and corresponding activity levels or heart rate ranges 340. For example, the user may specify that they would like accurate physiological data during times of moderate activity. In such cases, after receiving such input, the wearable device may adjust the ranges 340. For example, the wearable device may adjust the range 340-c such that the range 340-c spans 50% to 85% of the user's MHR. Thus, when the user participates in moderate activity, the wearable device will implement the measurement configuration 345-c and acquire accurate physiological data for the user.

Figure 4:
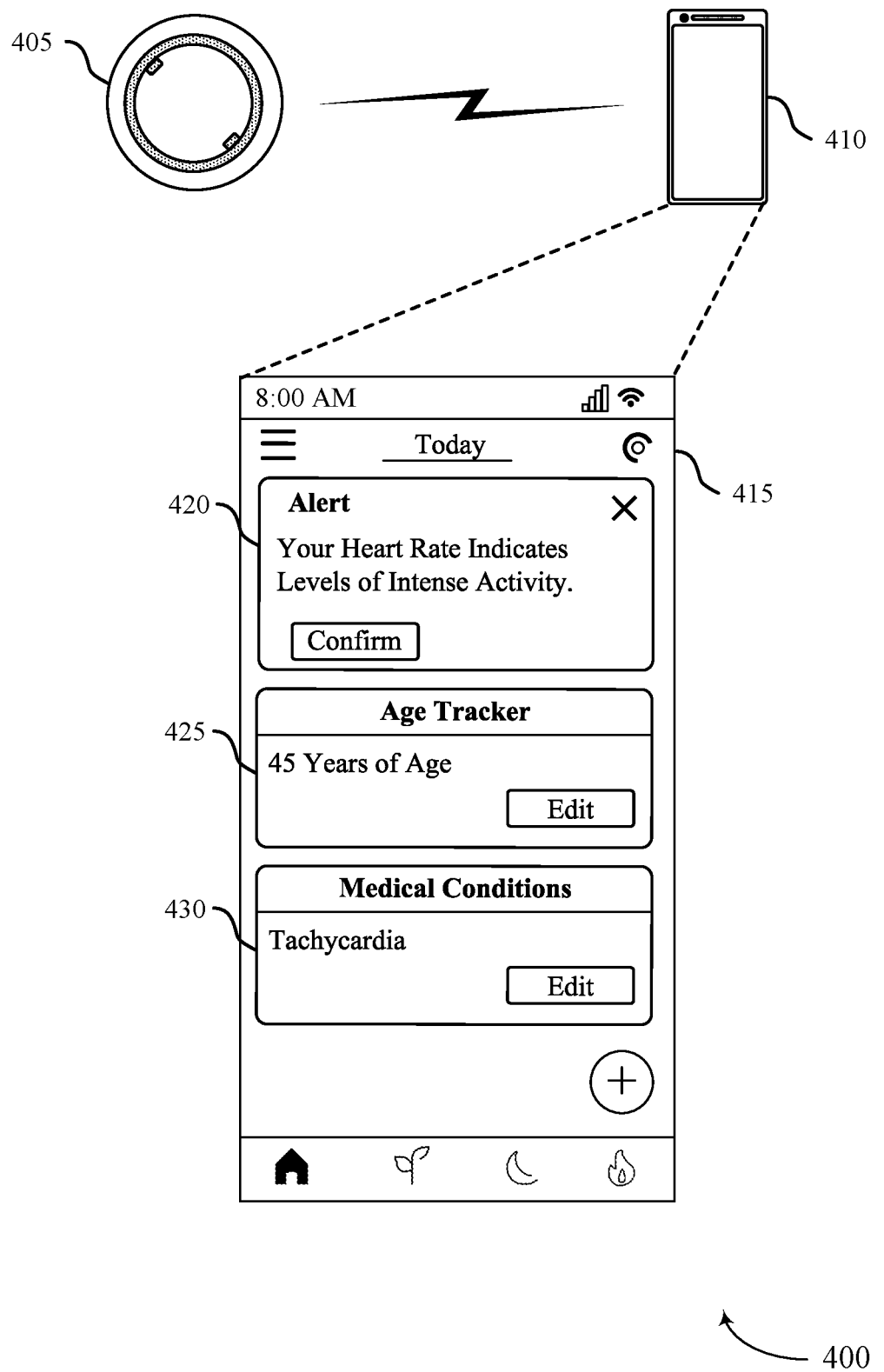
FIG. 4 shows an example of a graphical user interface (GUI) that supports techniques for adjusting power consumption of a wearable device based on heart rate data in accordance with aspects of the present disclosure.

FIG. 4 shows an example of a GUI 400 that supports techniques for adjusting power consumption of a wearable device based on heart rate data in accordance with aspects of the present disclosure. The GUI 400 may implement, or be implemented by, aspects of a system 100, a system 200, and a flow diagram 300. For example, the GUI 400 may be an example of a GUI 275 of a user device 106 corresponding to a user 102 as described with reference to FIG. 2. In some examples, the GUI 400 may illustrate an application page 415 which may be displayed to a user via the GUI 400.

As described in FIG. 3, a wearable device 405 may divide the MHR of a user of the wearable device 405 into different ranges and each range may represent a different activity level. For example, a first range may represent an intense activity level and may span 70% to 85% of the user's MHR, a second range may represent a moderate activity level and may span 50% to 70% of the user's MHR, and a third range may represent a sleep state and may be any heart rate below 50% of the user's MHR. In some examples, the age of the user (and/or other demographic characteristics of the user, such as gender, medical conditions, etc.) may influence the MHR of the user. As such, the wearable device 405 may take into account the age of the user (and other demographic characteristics) when determining the MHR and respective activity level ranges.

In some examples, the wearable device 405 may determine the age of the user based on user input. As shown in FIG. 4, the user may open an application associated with the user device 410 and input an age into the age tracker 425 of the application page 415 of the application. In the example of FIG. 4, the age of the user may be 45 years old. Based on the user's input, the wearable device 405 may determine the MHR of the user and corresponding activity level ranges. For example, the wearable device 405 may determine that the MHR for a user that is 45 years old is 165 bpm resulting in a first range of 123 bpm to 149 bpm, a second range of 88 bpm to 123 bpm, and a third range of less than 88 bpm.

Further, the wearable device 405 may further consider a medical condition of the user when determining the MHR and the corresponding activity level ranges. In such examples, as shown in FIG. 4, the user may open the application associated with the user device 410 and input one or more medical conditions into the medical condition 430 of the application page 415 of the application. In the example of FIG. 4, the user may input Tachycardia as a medical condition. Based on the user's input, the wearable device 405 may determine the MHR of the user and corresponding activity level ranges. For example, the wearable device 405 may shift the typical MHR for the user (e.g., average MHR for users of similar age) by an amount based on the medical conditions of the user. As an example, if the user suffers from Tachycardia, the wearable device 405 may increase the typical MHR for the user and determine the corresponding activity level ranges based on the shifted MHR.

As described in FIG. 3, the wearable device 405 may adapt a measurement configuration for collecting physiological data for the user based on an activity level of the user. For example, at a first time, the wearable device 405 may determine that the user is performing low or moderate activity and implement a low power measurement configuration. Further, at a second time, the wearable device 405 may determine that the user is performing intense activity and implement a high power measurement configuration. In addition to implementing the high power measurement configuration, the wearable device 405 may display an alert 420 on the application. As shown in FIG. 4, the alert 420 may include a message that states that "Your Heart Rate Indicates Levels of Intense Activity." Receiving such an alert 420 may allow the user to make informed decisions about their health.

Figure 5:
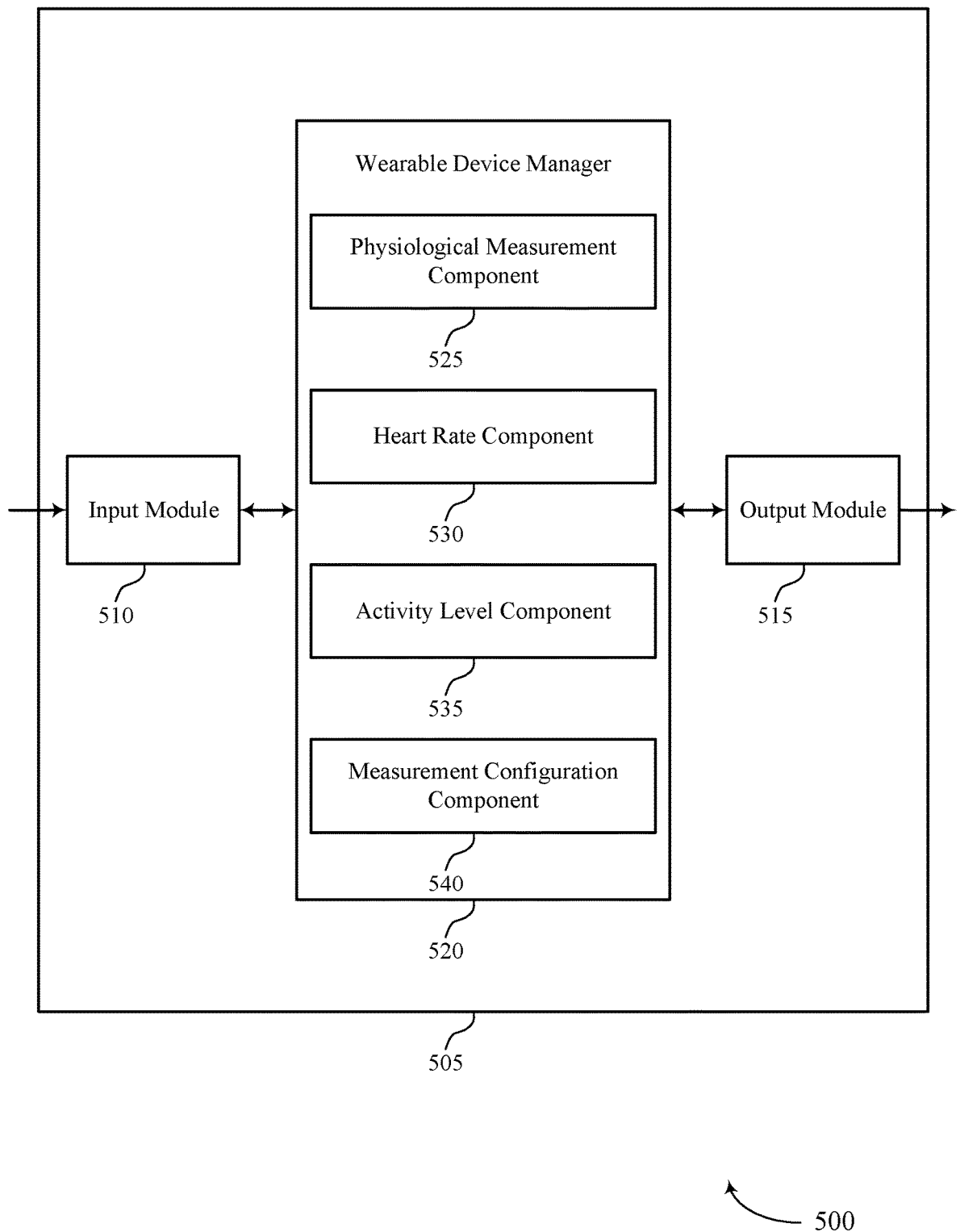
FIG. 5 shows a block diagram of an apparatus that supports techniques for adjusting power consumption of a wearable device based on heart rate data in accordance with aspects of the present disclosure.

FIG. 5 shows a block diagram 500 of a device 505 that supports techniques for adjusting power consumption of a wearable device based on heart rate data in accordance with aspects of the present disclosure. The device 505 may include an input module 510, an output module 515, and a wearable device manager 520. The device 505 may also include a processor. Each of these components may be in communication with one another (e.g., via one or more buses).

For example, the wearable device manager 520 may include a physiological measurement component 525, a heart rate component 530, an activity level component 535, a measurement configuration component 540, or any combination thereof. In some examples, the wearable device manager 520, or various components thereof, may be configured to perform various operations (e.g., receiving, monitoring, transmitting) using or otherwise in cooperation with the input module 510, the output module 515, or both. For example, the wearable device manager 520 may receive information from the input module 510, send information to the output module 515, or be integrated in combination with the input module 510, the output module 515, or both to receive information, transmit information, or perform various other operations as described herein.

The wearable device manager 520 may support controlling a battery consumption of a wearable device in accordance with examples as disclosed herein. The physiological measurement component 525 may be configured as or otherwise support a means for acquiring first physiological data from a user via one or more sensors of the wearable device, wherein the first physiological data is acquired in accordance with a first measurement configuration associated with the one or more sensors, the first measurement configuration associated with a first power consumption. The heart rate component 530 may be configured as or otherwise support a means for determining a heart rate of the user based at least in part on the first physiological data. The activity level component 535 may be configured as or otherwise support a means for comparing the heart rate to a set of heart rate ranges associated with the user, wherein the set of heart rate ranges are based at least in part on one or more demographic characteristics of the user, and wherein the set of heart rate ranges correspond to a set of measurement configurations including the first measurement configuration. The measurement configuration component 540 may be configured as or otherwise support a means for selecting a second measurement configuration from the set of measurement configurations based at least in part on the heart rate of the user falling into a second heart rate range of the set of heart rate ranges, wherein the second measurement configuration corresponds to the second heart rate range and is associated with a second power consumption different from the first power consumption. The physiological measurement component 525 may be configured as or otherwise support a means for acquiring second physiological data from the user via the one or more sensors of the wearable device, wherein the second physiological data is acquired in accordance with the second measurement configuration.

Figure 6:
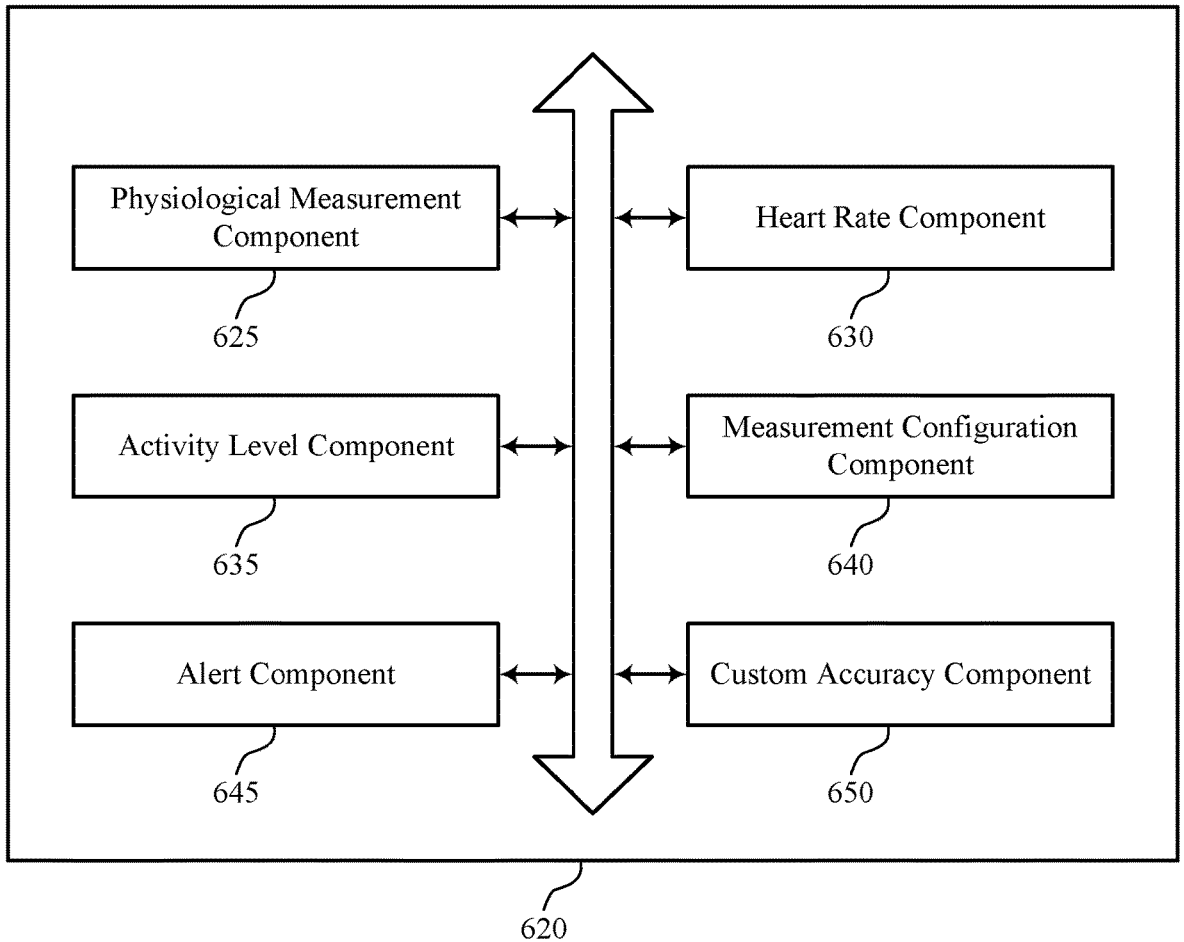
FIG. 6 shows a block diagram of a wearable device manager that supports techniques for adjusting power consumption of a wearable device based on heart rate data in accordance with aspects of the present disclosure.

FIG. 6 shows a block diagram 600 of a wearable device manager 620 that supports techniques for adjusting power consumption of a wearable device based on heart rate data in accordance with aspects of the present disclosure. The wearable device manager 620 may be an example of aspects of a wearable device manager or a wearable device manager 520, or both, as described herein. The wearable device manager 620, or various components thereof, may be an example of means for performing various aspects of techniques for adjusting power consumption of a wearable device based on heart rate data as described herein. For example, the wearable device manager 620 may include a physiological measurement component 625, a heart rate component 630, an activity level component 635, a measurement configuration component 640, an alert component 645, a custom accuracy component 650, or any combination thereof. Each of these components may communicate, directly or indirectly, with one another (e.g., via one or more buses).

The wearable device manager 620 may support controlling a battery consumption of a wearable device in accordance with examples as disclosed herein. The physiological measurement component 625 may be configured as or otherwise support a means for acquiring first physiological data from a user via one or more sensors of the wearable device, wherein the first physiological data is acquired in accordance with a first measurement configuration associated with the one or more sensors, the first measurement configuration associated with a first power consumption. The heart rate component 630 may be configured as or otherwise support a means for determining a heart rate of the user based at least in part on the first physiological data. The activity level component 635 may be configured as or otherwise support a means for comparing the heart rate to a set of heart rate ranges associated with the user, wherein the set of heart rate ranges are based at least in part on one or more demographic characteristics of the user, and wherein the set of heart rate ranges correspond to a set of measurement configurations including the first measurement configuration. The measurement configuration component 640 may be configured as or otherwise support a means for selecting a second measurement configuration from the set of measurement configurations based at least in part on the heart rate of the user falling into a second heart rate range of the set of heart rate ranges, wherein the second measurement configuration corresponds to the second heart rate range and is associated with a second power consumption different from the first power consumption. In some examples, the physiological measurement component 625 may be configured as or otherwise support a means for acquiring second physiological data from the user via the one or more sensors of the wearable device, wherein the second physiological data is acquired in accordance with the second measurement configuration.

In some examples, the heart rate component 630 may be configured as or otherwise support a means for determining an additional heart rate of the user prior to acquiring the first physiological data. In some examples, the activity level component 635 may be configured as or otherwise support a means for comparing the additional heart rate to the set of heart rate ranges associated with the user, wherein the first physiological data is acquired in accordance with the first measurement configuration based at least in part on the additional heart rate falling into a first heart rate range of the set of heart rate ranges, wherein the first measurement configuration corresponds to the first heart rate range.

In some examples, the one or more demographic characteristics of the user comprise a chronological age of the user, a cardiovascular age of the user, a gender of the user, or any combination thereof.

In some examples, the activity level component 635 may be configured as or otherwise support a means for estimating an activity level of the user based at least in part on comparing the heart rate of the user to the set of heart rate ranges, wherein selecting the second measurement configuration is based at least in part on the estimated activity level.

In some examples, the first physiological data comprises motion data, and the activity level component 635 may be configured as or otherwise support a means for validating the estimated activity level based at least in part on the motion data, wherein selecting the second measurement configuration is based at least in part on validating the estimated activity level. In some examples, the one or more sensors comprise an accelerometer, a gyroscope, or any combination thereof.

In some examples, the activity level component 635 may be configured as or otherwise support a means for receiving one or more user inputs indicating the one or more demographic characteristics of the user, a medical condition associated with the user, or any combination thereof, wherein the set of heart rate ranges are based at least in part on the one or more user inputs.

In some examples, the activity level component 635 may be configured as or otherwise support a means for determining the set of heart rate ranges based at least in part on heart rate data associated with one or more additional users, wherein the one or more additional users are associated with the one or more demographic characteristics, a medical condition associated with the user, or both.

In some examples, the set of heart rate ranges are further based at least in part on heart rate ranges established by one or more medical associations based at least in part on the one or more demographic characteristics, the medical condition, or both.

In some examples, the alert component 645 may be configured as or otherwise support a means for displaying, via the wearable device, a user device associated with the wearable device, or both, a message associated with the heart rate of the user based at least in part on the heart rate of the user changing from a first heart rate range of the set of heart rate ranges to the second heart rate range of the set of heart rate ranges.

In some examples, the measurement configuration component 640 may be configured as or otherwise support a means for adjusting one or more operational parameters of the one or more sensors based at least in part on selecting the second measurement configuration.

In some examples, to support adjusting the one or more operational parameters of the one or more sensors, the measurement configuration component 640 may be configured as or otherwise support a means for activating or deactivating one or more components associated with at least one sensor of the one or more sensors.

In some examples, to support adjusting the one or more operational parameters of the one or more sensors, the measurement configuration component 640 may be configured as or otherwise support a means for increasing or decreasing a sampling rate associated with the one or more sensors.

In some examples, the custom accuracy component 650 may be configured as or otherwise support a means for receiving one or more user inputs indicating a relationship between the second heart rate range and the second measurement configuration, wherein acquiring the second physiological data in accordance with the second measurement configuration is based at least in part on receiving the one or more user inputs.

In some examples, each heart rate range of the set of heart rate ranges corresponds to a respective activity level of a set of activity levels associated with the user, the set of activity levels comprising a sleeping state, a mild activity state, and an intense activity state.

In some examples, to support selecting the second measurement configuration, the measurement configuration component 640 may be configured as or otherwise support a means for selecting the second measurement configuration that is associated with a higher sampling rate, a higher resolution, or both, as compared to the first measurement configuration based at least in part on the second heart rate range corresponding to the intense activity state.

In some examples, to support selecting the second measurement configuration, the measurement configuration component 640 may be configured as or otherwise support a means for selecting the second measurement configuration that is associated with a lower sampling rate, a lower resolution, or both, as compared to the first measurement configuration based at least in part on the second heart rate range corresponding to one of the sleeping state or the mild activity state.

In some examples, each measurement configuration of the set of measurement configurations comprises a respective set of operational parameters of the one or more sensors, the respective sets of operational parameters comprising a respective baud rate associated with acquiring or communicating physiological data, a respective sampling rate associated with acquiring the physiological data, a respective clock speed associated with acquiring the physiological data, a respective bit rate for acquiring the physiological data, a respective resolution for acquiring the physiological data, or any combination thereof.

In some examples, the wearable device comprises a wearable ring device.

Figure 7:
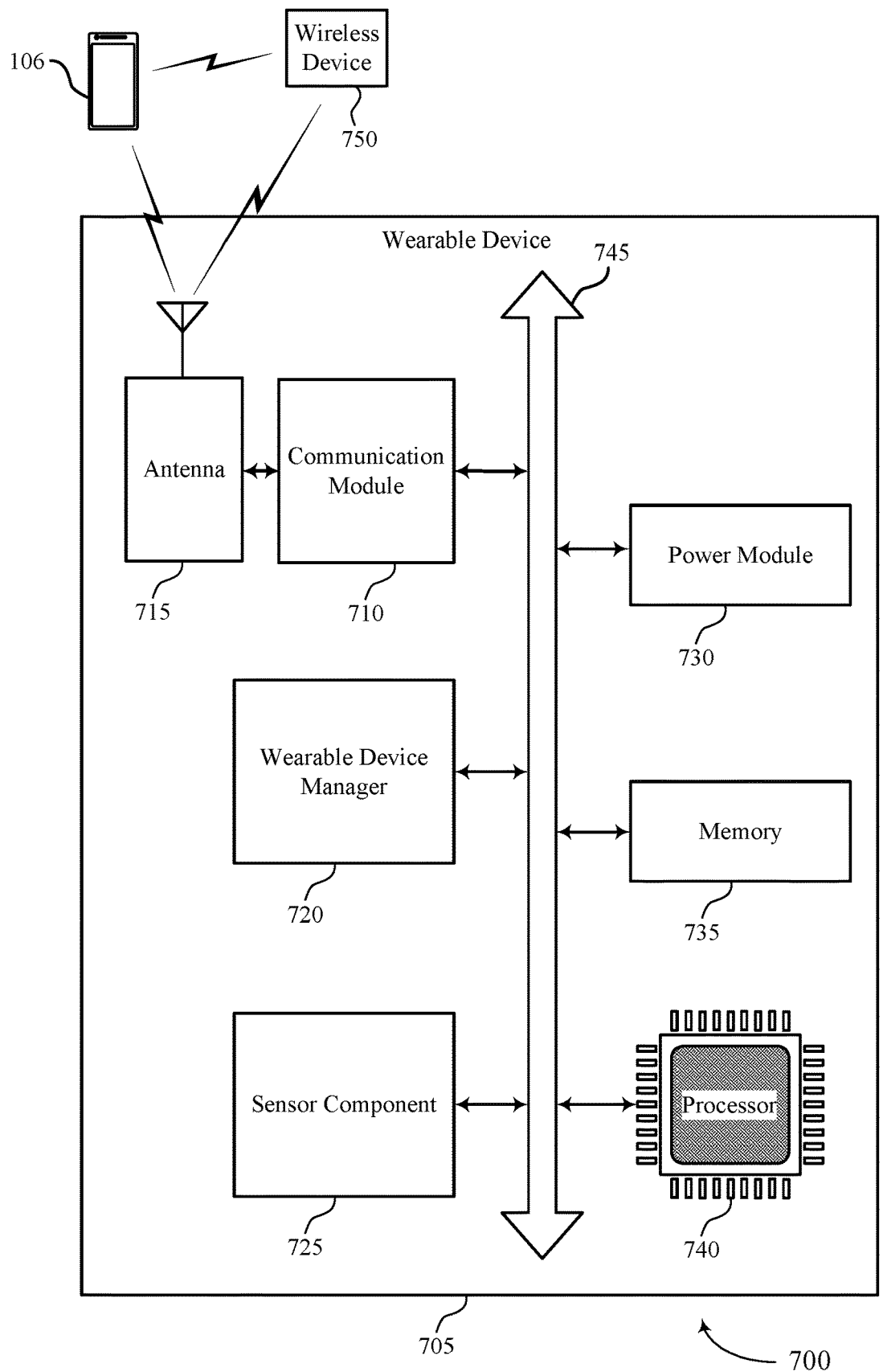
FIG. 7 shows a diagram of a system including a device that supports techniques for adjusting power consumption of a wearable device based on heart rate data in accordance with aspects of the present disclosure.

FIG. 7 shows a diagram of a system 700 including a device 705 that supports techniques for adjusting power consumption of a wearable device based on heart rate data in accordance with aspects of the present disclosure. The device 705 may be an example of or include the components of a device 505 as described herein. The device 705 may include an example of a wearable device 104, as described previously herein. The device 705 may include components for bi-directional communications including components for transmitting and receiving communications with a user device 106 and a server 110, such as a wearable device manager 720, a communication module 710, an antenna 715, a sensor component 725, a power module 730, a memory 735, a processor 740, and a wireless device 750. These components may be in electronic communication or otherwise coupled (e.g., operatively, communicatively, functionally, electronically, electrically) via one or more buses (e.g., a bus 745).

The wearable device manager 720 may support controlling a battery consumption of a wearable device in accordance with examples as disclosed herein. For example, the wearable device manager 720 may be configured as or otherwise support a means for acquiring first physiological data from a user via one or more sensors of the wearable device, wherein the first physiological data is acquired in accordance with a first measurement configuration associated with the one or more sensors, the first measurement configuration associated with a first power consumption. The wearable device manager 720 may be configured as or otherwise support a means for determining a heart rate of the user based at least in part on the first physiological data. The wearable device manager 720 may be configured as or otherwise support a means for comparing the heart rate to a set of heart rate ranges associated with the user, wherein the set of heart rate ranges are based at least in part on one or more demographic characteristics of the user, and wherein the set of heart rate ranges correspond to a set of measurement configurations including the first measurement configuration. The wearable device manager 720 may be configured as or otherwise support a means for selecting a second measurement configuration from the set of measurement configurations based at least in part on the heart rate of the user falling into a second heart rate range of the set of heart rate ranges, wherein the second measurement configuration corresponds to the second heart rate range and is associated with a second power consumption different from the first power consumption. The wearable device manager 720 may be configured as or otherwise support a means for acquiring second physiological data from the user via the one or more sensors of the wearable device, wherein the second physiological data is acquired in accordance with the second measurement configuration.

By including or configuring the wearable device manager 720 in accordance with examples as described herein, the device 705 may support techniques for longer battery life.

Figure 8:
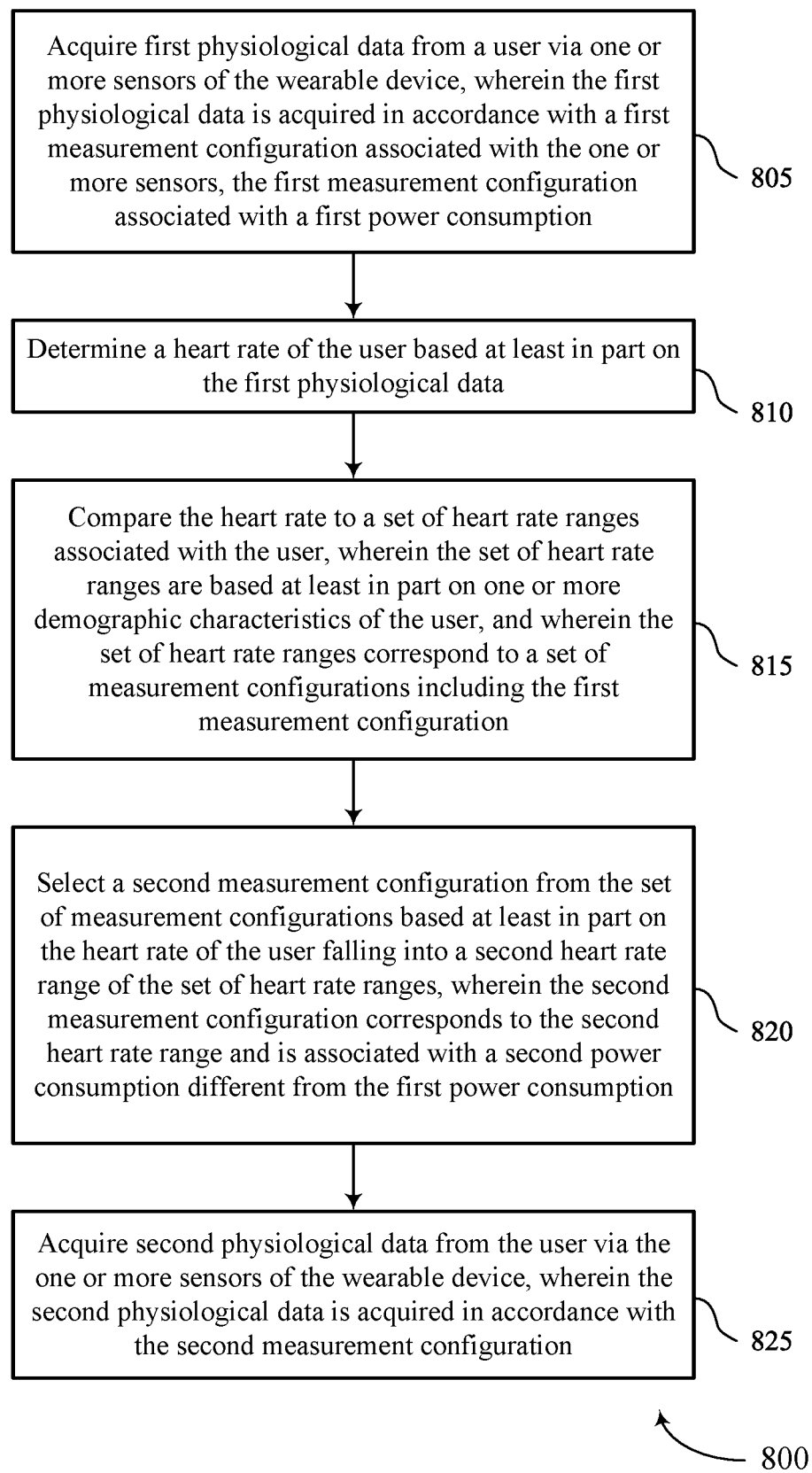
FIGS. 8 and 9 show flowcharts illustrating methods that support techniques for adjusting power consumption of a wearable device based on heart rate data in accordance with aspects of the present disclosure.

FIG. 8 shows a flowchart illustrating a method 800 that supports techniques for adjusting power consumption of a wearable device based on heart rate data in accordance with aspects of the present disclosure. The operations of the method 800 may be implemented by a wearable device or its components as described herein. For example, the operations of the method 800 may be performed by a wearable device as described with reference to FIGS. 1 through 7. In some examples, a wearable device may execute a set of instructions to control the functional elements of the wearable device to perform the described functions. Additionally, or alternatively, the wearable device may perform aspects of the described functions using special-purpose hardware.

At 805, the method may include acquiring first physiological data from a user via one or more sensors of the wearable device, wherein the first physiological data is acquired in accordance with a first measurement configuration associated with the one or more sensors, the first measurement configuration associated with a first power consumption. The operations of block 805 may be performed in accordance with examples as disclosed herein. In some examples, aspects of the operations of 805 may be performed by a physiological measurement component 625 as described with reference to FIG. 6.

At 810, the method may include determining a heart rate of the user based at least in part on the first physiological data. The operations of block 810 may be performed in accordance with examples as disclosed herein. In some examples, aspects of the operations of 810 may be performed by a heart rate component 630 as described with reference to FIG. 6.

At 815, the method may include comparing the heart rate to a set of heart rate ranges associated with the user, wherein the set of heart rate ranges are based at least in part on one or more demographic characteristics of the user, and wherein the set of heart rate ranges correspond to a set of measurement configurations including the first measurement configuration. The operations of block 815 may be performed in accordance with examples as disclosed herein. In some examples, aspects of the operations of 815 may be performed by an activity level component 635 as described with reference to FIG. 6.

At 820, the method may include selecting a second measurement configuration from the set of measurement configurations based at least in part on the heart rate of the user falling into a second heart rate range of the set of heart rate ranges, wherein the second measurement configuration corresponds to the second heart rate range and is associated with a second power consumption different from the first power consumption. The operations of block 820 may be performed in accordance with examples as disclosed herein. In some examples, aspects of the operations of 820 may be performed by a measurement configuration component 640 as described with reference to FIG. 6.

At 825, the method may include acquiring second physiological data from the user via the one or more sensors of the wearable device, wherein the second physiological data is acquired in accordance with the second measurement configuration. The operations of block 825 may be performed in accordance with examples as disclosed herein. In some examples, aspects of the operations of 825 may be performed by a physiological measurement component 625 as described with reference to FIG. 6.

Figure 9:
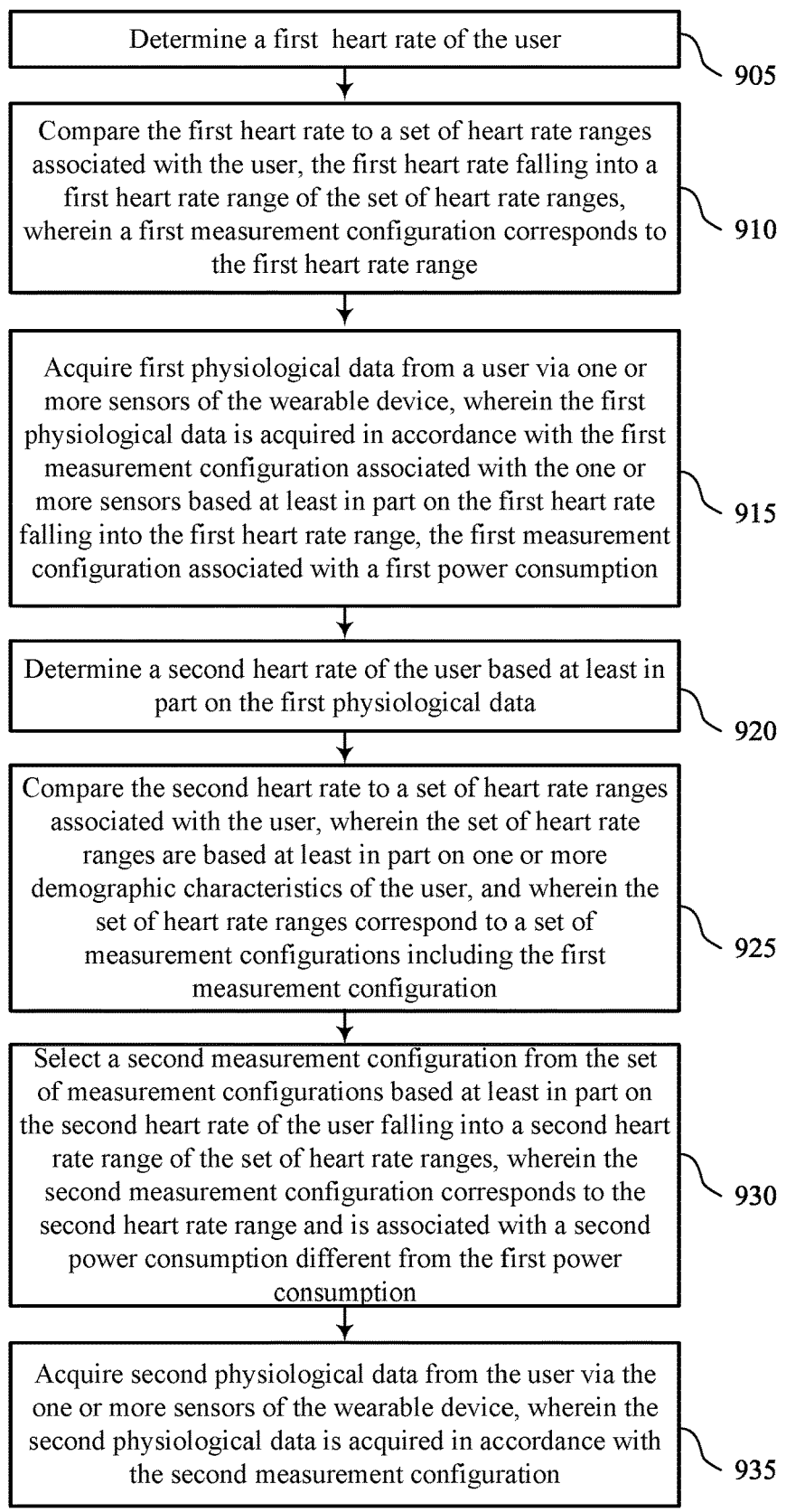

FIG. 9 shows a flowchart illustrating a method 900 that supports techniques for adjusting power consumption of a wearable device based on heart rate data in accordance with aspects of the present disclosure. The operations of the method 900 may be implemented by a wearable device or its components as described herein. For example, the operations of the method 900 may be performed by a wearable device as described with reference to FIGS. 1 through 7. In some examples, a wearable device may execute a set of instructions to control the functional elements of the wearable device to perform the described functions. Additionally, or alternatively, the wearable device may perform aspects of the described functions using special-purpose hardware.

At 905, the method may include determining a first heart rate of the user. The operations of block 905 may be performed in accordance with examples as disclosed herein. In some examples, aspects of the operations of 905 may be performed by a heart rate component 630 as described with reference to FIG. 6.

At 910, the method may include comparing the first heart rate to the set of heart rate ranges associated with the user, the first heart rate falling into a first heart rate range of the set of heart rate ranges, wherein a first measurement configuration corresponds to the first heart rate range. The operations of block 910 may be performed in accordance with examples as disclosed herein. In some examples, aspects of the operations of 910 may be performed by an activity level component 635 as described with reference to FIG. 6.

At 915, the method may include acquiring first physiological data from a user via one or more sensors of the wearable device, wherein the first physiological data is acquired in accordance with a first measurement configuration associated with the one or more sensors based at least in part on the first heart rate falling into the first heart rate range, the first measurement configuration associated with a first power consumption. The operations of block 915 may be performed in accordance with examples as disclosed herein. In some examples, aspects of the operations of 915 may be performed by a physiological measurement component 625 as described with reference to FIG. 6.

At 920, the method may include determining a second heart rate of the user based at least in part on the first physiological data. The operations of block 920 may be performed in accordance with examples as disclosed herein. In some examples, aspects of the operations of 920 may be performed by a heart rate component 630 as described with reference to FIG. 6.

At 925, the method may include comparing the second heart rate to a set of heart rate ranges associated with the user, wherein the set of heart rate ranges are based at least in part on one or more demographic characteristics of the user, and wherein the set of heart rate ranges correspond to a set of measurement configurations including the first measurement configuration. The operations of block 925 may be performed in accordance with examples as disclosed herein. In some examples, aspects of the operations of 925 may be performed by an activity level component 635 as described with reference to FIG. 6.

At 930, the method may include selecting a second measurement configuration from the set of measurement configurations based at least in part on the second heart rate of the user falling into a second heart rate range of the set of heart rate ranges, wherein the second measurement configuration corresponds to the second heart rate range and is associated with a second power consumption different from the first power consumption. The operations of block 930 may be performed in accordance with examples as disclosed herein. In some examples, aspects of the operations of 930 may be performed by a measurement configuration component 640 as described with reference to FIG. 6.

At 935, the method may include acquiring second physiological data from the user via the one or more sensors of the wearable device, wherein the second physiological data is acquired in accordance with the second measurement configuration. The operations of block 935 may be performed in accordance with examples as disclosed herein. In some examples, aspects of the operations of 935 may be performed by a physiological measurement component 625 as described with reference to FIG. 6.

It should be noted that the methods described above describe possible implementations, and that the operations and the steps may be rearranged or otherwise modified and that other implementations are possible. Furthermore, aspects from two or more of the methods may be combined.

A method for controlling a battery consumption of a wearable device is described. The method may include acquiring first physiological data from a user via one or more sensors of the wearable device, wherein the first physiological data is acquired in accordance with a first measurement configuration associated with the one or more sensors, the first measurement configuration associated with a first power consumption, determining a heart rate of the user based at least in part on the first physiological data, comparing the heart rate to a set of heart rate ranges associated with the user, wherein the set of heart rate ranges are based at least in part on one or more demographic characteristics of the user, and wherein the set of heart rate ranges correspond to a set of measurement configurations including the first measurement configuration, selecting a second measurement configuration from the set of measurement configurations based at least in part on the heart rate of the user falling into a second heart rate range of the set of heart rate ranges, wherein the second measurement configuration corresponds to the second heart rate range and is associated with a second power consumption different from the first power consumption, and acquiring second physiological data from the user via the one or more sensors of the wearable device, wherein the second physiological data is acquired in accordance with the second measurement configuration.

An apparatus for controlling a battery consumption of a wearable device is described. The apparatus may include a processor, memory coupled with the processor, and instructions stored in the memory. The instructions may be executable by the processor to cause the apparatus to acquire first physiological data from a user via one or more sensors of the wearable device, wherein the first physiological data is acquired in accordance with a first measurement configuration associated with the one or more sensors, the first measurement configuration associated with a first power consumption, determine a heart rate of the user based at least in part on the first physiological data, compare the heart rate to a set of heart rate ranges associated with the user, wherein the set of heart rate ranges are based at least in part on one or more demographic characteristics of the user, and wherein the set of heart rate ranges correspond to a set of measurement configurations including the first measurement configuration, select a second measurement configuration from the set of measurement configurations based at least in part on the heart rate of the user falling into a second heart rate range of the set of heart rate ranges, wherein the second measurement configuration corresponds to the second heart rate range and is associated with a second power consumption different from the first power consumption, and acquire second physiological data from the user via the one or more sensors of the wearable device, wherein the second physiological data is acquired in accordance with the second measurement configuration.

Another apparatus for controlling a battery consumption of a wearable device is described. The apparatus may include means for acquiring first physiological data from a user via one or more sensors of the wearable device, wherein the first physiological data is acquired in accordance with a first measurement configuration associated with the one or more sensors, the first measurement configuration associated with a first power consumption, means for determining a heart rate of the user based at least in part on the first physiological data, means for comparing the heart rate to a set of heart rate ranges associated with the user, wherein the set of heart rate ranges are based at least in part on one or more demographic characteristics of the user, and wherein the set of heart rate ranges correspond to a set of measurement configurations including the first measurement configuration, means for selecting a second measurement configuration from the set of measurement configurations based at least in part on the heart rate of the user falling into a second heart rate range of the set of heart rate ranges, wherein the second measurement configuration corresponds to the second heart rate range and is associated with a second power consumption different from the first power consumption, and means for acquiring second physiological data from the user via the one or more sensors of the wearable device, wherein the second physiological data is acquired in accordance with the second measurement configuration.

A non-transitory computer-readable medium storing code for controlling a battery consumption of a wearable device is described. The code may include instructions executable by a processor to acquire first physiological data from a user via one or more sensors of the wearable device, wherein the first physiological data is acquired in accordance with a first measurement configuration associated with the one or more sensors, the first measurement configuration associated with a first power consumption, determine a heart rate of the user based at least in part on the first physiological data, compare the heart rate to a set of heart rate ranges associated with the user, wherein the set of heart rate ranges are based at least in part on one or more demographic characteristics of the user, and wherein the set of heart rate ranges correspond to a set of measurement configurations including the first measurement configuration, select a second measurement configuration from the set of measurement configurations based at least in part on the heart rate of the user falling into a second heart rate range of the set of heart rate ranges, wherein the second measurement configuration corresponds to the second heart rate range and is associated with a second power consumption different from the first power consumption, and acquire second physiological data from the user via the one or more sensors of the wearable device, wherein the second physiological data is acquired in accordance with the second measurement configuration.

Some examples of the method, apparatuses, and non-transitory computer-readable medium described herein may further include operations, features, means, or instructions for determining an additional heart rate of the user prior to acquiring the first physiological data and comparing the additional heart rate to the set of heart rate ranges associated with the user, wherein the first physiological data may be acquired in accordance with the first measurement configuration based at least in part on the additional heart rate falling into a first heart rate range of the set of heart rate ranges, wherein the first measurement configuration corresponds to the first heart rate range.

In some examples of the method, apparatuses, and non-transitory computer-readable medium described herein, the one or more demographic characteristics of the user comprise a chronological age of the user, a cardiovascular age of the user, a gender of the user, or any combination thereof.

Some examples of the method, apparatuses, and non-transitory computer-readable medium described herein may further include operations, features, means, or instructions for estimating an activity level of the user based at least in part on comparing the heart rate of the user to the set of heart rate ranges, wherein selecting the second measurement configuration may be based at least in part on the estimated activity level.

In some examples of the method, apparatuses, and non-transitory computer-readable medium described herein, the first physiological data comprises motion data and the method, apparatuses, and non-transitory computer-readable medium may include further operations, features, means, or instructions for validating the estimated activity level based at least in part on the motion data, wherein selecting the second measurement configuration may be based at least in part on validating the estimated activity level.

In some examples of the method, apparatuses, and non-transitory computer-readable medium described herein, the one or more sensors comprise an accelerometer, a gyroscope, or any combination thereof.

Some examples of the method, apparatuses, and non-transitory computer-readable medium described herein may further include operations, features, means, or instructions for receiving one or more user inputs indicating the one or more demographic characteristics of the user, a medical condition associated with the user, or any combination thereof, wherein the set of heart rate ranges may be based at least in part on the one or more user inputs.

Some examples of the method, apparatuses, and non-transitory computer-readable medium described herein may further include operations, features, means, or instructions for determining the set of heart rate ranges based at least in part on heart rate data associated with one or more additional users, wherein the one or more additional users may be associated with the one or more demographic characteristics, a medical condition associated with the user, or both.

In some examples of the method, apparatuses, and non-transitory computer-readable medium described herein, the set of heart rate ranges may be further based at least in part on heart rate ranges established by one or more medical associations based at least in part on the one or more demographic characteristics, the medical condition, or both.

Some examples of the method, apparatuses, and non-transitory computer-readable medium described herein may further include operations, features, means, or instructions for displaying, via the wearable device, a user device associated with the wearable device, or both, a message associated with the heart rate of the user based at least in part on the heart rate of the user changing from a first heart rate range of the set of heart rate ranges to the second heart rate range of the set of heart rate ranges.

Some examples of the method, apparatuses, and non-transitory computer-readable medium described herein may further include operations, features, means, or instructions for adjusting one or more operational parameters of the one or more sensors based at least in part on selecting the second measurement configuration.

In some examples of the method, apparatuses, and non-transitory computer-readable medium described herein, adjusting the one or more operational parameters of the one or more sensors may include operations, features, means, or instructions for activating or deactivating one or more components associated with at least one sensor of the one or more sensors.

In some examples of the method, apparatuses, and non-transitory computer-readable medium described herein, adjusting the one or more operational parameters of the one or more sensors may include operations, features, means, or instructions for increasing or decreasing a sampling rate associated with the one or more sensors.

Some examples of the method, apparatuses, and non-transitory computer-readable medium described herein may further include operations, features, means, or instructions for receiving one or more user inputs indicating a relationship between the second heart rate range and the second measurement configuration, wherein acquiring the second physiological data in accordance with the second measurement configuration may be based at least in part on receiving the one or more user inputs.

In some examples of the method, apparatuses, and non-transitory computer-readable medium described herein, each heart rate range of the set of heart rate ranges corresponds to a respective activity level of a set of activity levels associated with the user, the set of activity levels comprising a sleeping state, a mild activity state, and an intense activity state.

In some examples of the method, apparatuses, and non-transitory computer-readable medium described herein, selecting the second measurement configuration may include operations, features, means, or instructions for selecting the second measurement configuration that may be associated with a higher sampling rate, a higher resolution, or both, as compared to the first measurement configuration based at least in part on the second heart rate range corresponding to the intense activity state.

In some examples of the method, apparatuses, and non-transitory computer-readable medium described herein, selecting the second measurement configuration may include operations, features, means, or instructions for selecting the second measurement configuration that may be associated with a lower sampling rate, a lower resolution, or both, as compared to the first measurement configuration based at least in part on the second heart rate range corresponding to one of the sleeping state or the mild activity state.

In some examples of the method, apparatuses, and non-transitory computer-readable medium described herein, each measurement configuration of the set of measurement configurations comprises a respective set of operational parameters of the one or more sensors, the respective sets of operational parameters comprising a respective baud rate associated with acquiring or communicating physiological data, a respective sampling rate associated with acquiring the physiological data, a respective clock speed associated with acquiring the physiological data, a respective bit rate for acquiring the physiological data, a respective resolution for acquiring the physiological data, or any combination thereof.

In some examples of the method, apparatuses, and non-transitory computer-readable medium described herein, the wearable device comprises a wearable ring device.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for controlling a battery consumption of a wearable device, comprising:

acquiring first physiological data from a user via one or more sensors of the wearable device, wherein the first physiological data is acquired in accordance with a first measurement configuration associated with the one or more sensors, the first measurement configuration associated with a first power consumption;

determining a heart rate of the user based at least in part on the first physiological data;

comparing the heart rate to a set of heart rate ranges associated with the user, wherein the set of heart rate ranges are based at least in part on one or more demographic characteristics of the user, and wherein the set of heart rate ranges correspond to a set of measurement configurations including the first measurement configuration;
selecting a second measurement configuration from the set of measurement configurations based at least in part on the heart rate of the user falling into a second heart rate range of the set of heart rate ranges, wherein the second measurement configuration corresponds to the second heart rate range and is associated with a second power consumption different from the first power consumption; and
acquiring second physiological data from the user via the one or more sensors of the wearable device, wherein the second physiological data is acquired in accordance with the second measurement configuration.

2. The method of claim 1, further comprising:
determining an additional heart rate of the user prior to acquiring the first physiological data; and
comparing the additional heart rate to the set of heart rate ranges associated with the user, wherein the first physiological data is acquired in accordance with the first measurement configuration based at least in part on the additional heart rate falling into a first heart rate range of the set of heart rate ranges, wherein the first measurement configuration corresponds to the first heart rate range.

3. The method of claim 1, wherein the one or more demographic characteristics of the user comprise a chronological age of the user, a cardiovascular age of the user, a gender of the user, or any combination thereof.

4. The method of claim 1, further comprising:
estimating an activity level of the user based at least in part on comparing the heart rate of the user to the set of heart rate ranges, wherein selecting the second measurement configuration is based at least in part on the estimated activity level.

5. The method of claim 4, wherein the first physiological data comprises motion data, the method further comprising:
validating the estimated activity level based at least in part on the motion data, wherein selecting the second measurement configuration is based at least in part on validating the estimated activity level.

6. The method of claim 5, wherein the one or more sensors comprise an accelerometer, a gyroscope, or any combination thereof.

7. The method of claim 1, further comprising:
receiving one or more user inputs indicating the one or more demographic characteristics of the user, a medical condition associated with the user, or any combination thereof, wherein the set of heart rate ranges are based at least in part on the one or more user inputs.

8. The method of claim 1, further comprising:
determining the set of heart rate ranges based at least in part on heart rate data associated with one or more additional users, wherein the one or more additional users are associated with the one or more demographic characteristics, a medical condition associated with the user, or both.

9. The method of claim 8, wherein the set of heart rate ranges are further based at least in part on heart rate ranges established by one or more medical associations based at least in part on the one or more demographic characteristics, the medical condition, or both.

10. The method of claim 1, further comprising:
displaying, via the wearable device, a user device associated with the wearable device, or both, a message associated with the heart rate of the user based at least in part on the heart rate of the user changing from a first heart rate range of the set of heart rate ranges to the second heart rate range of the set of heart rate ranges.

11. The method of claim 1, further comprising:
adjusting one or more operational parameters of the one or more sensors based at least in part on selecting the second measurement configuration.

12. The method of claim 11, wherein adjusting the one or more operational parameters of the one or more sensors comprises:
activating or deactivating one or more components associated with at least one sensor of the one or more sensors.

13. The method of claim 11, wherein adjusting the one or more operational parameters of the one or more sensors comprises:
increasing or decreasing a sampling rate associated with the one or more sensors.

14. The method of claim 1, further comprising:
receiving one or more user inputs indicating a relationship between the second heart rate range and the second measurement configuration, wherein acquiring the second physiological data in accordance with the second measurement configuration is based at least in part on receiving the one or more user inputs.

15. The method of claim 1, wherein each heart rate range of the set of heart rate ranges corresponds to a respective activity level of a set of activity levels associated with the user, the set of activity levels comprising a sleeping state, a mild activity state, and an intense activity state.

16. The method of claim 15, wherein the second heart rate range of the set of heart rate ranges corresponds to the intense activity state, wherein selecting the second measurement configuration comprises:
selecting the second measurement configuration that is associated with a higher sampling rate, a higher resolution, or both, as compared to the first measurement configuration based at least in part on the second heart rate range corresponding to the intense activity state.

17. The method of claim 15, wherein the second heart rate range of the set of heart rate ranges corresponds to one of the sleeping state or the mild activity state, wherein selecting the second measurement configuration comprises:
selecting the second measurement configuration that is associated with a lower sampling rate, a lower resolution, or both, as compared to the first measurement configuration based at least in part on the second heart rate range corresponding to one of the sleeping state or the mild activity state.

18. The method of claim 1, wherein each measurement configuration of the set of measurement configurations comprises a respective set of operational parameters of the one or more sensors, the respective sets of operational parameters comprising a respective baud rate associated with acquiring or communicating physiological data, a respective sampling rate associated with acquiring the physiological data, a respective clock speed associated with acquiring the physiological data, a respective bit rate for acquiring the physiological data, a respective resolution for acquiring the physiological data, or any combination thereof.

19. The method of claim 1, wherein the wearable device comprises a wearable ring device.

20. An apparatus for controlling a battery consumption of a wearable device, comprising:
- a processor;
- memory coupled with the processor; and
- instructions stored in the memory and executable by the processor to cause the apparatus to:
  - acquire first physiological data from a user via one or more sensors of the wearable device, wherein the first physiological data is acquired in accordance with a first measurement configuration associated with the one or more sensors, the first measurement configuration associated with a first power consumption;
  - determine a heart rate of the user based at least in part on the first physiological data;
  - compare the heart rate to a set of heart rate ranges associated with the user, wherein the set of heart rate ranges are based at least in part on one or more demographic characteristics of the user, and wherein the set of heart rate ranges correspond to a set of measurement configurations including the first measurement configuration;
  - select a second measurement configuration from the set of measurement configurations based at least in part on the heart rate of the user falling into a second heart rate range of the set of heart rate ranges, wherein the second measurement configuration corresponds to the second heart rate range and is associated with a second power consumption different from the first power consumption; and
  - acquire second physiological data from the user via the one or more sensors of the wearable device, wherein the second physiological data is acquired in accordance with the second measurement configuration.

* * * * *